(12) United States Patent
Noth et al.

(10) Patent No.: US 10,765,126 B2
(45) Date of Patent: Sep. 8, 2020

(54) CONTAINER, DEVICE AND SYSTEM

(71) Applicant: NESTEC S.A., Vevey (CH)

(72) Inventors: Andre Noth, Pully (CH); Alexandre Kollep, Lutry (CH); Damien Neurohr, Bramois (CH); Etienne Claude Jaquier, Oron-la-Ville (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/333,663

(22) PCT Filed: Sep. 14, 2017

(86) PCT No.: PCT/EP2017/073086
§ 371 (c)(1),
(2) Date: Mar. 15, 2019

(87) PCT Pub. No.: WO2018/054749
PCT Pub. Date: Mar. 29, 2018

(65) Prior Publication Data
US 2019/0254307 A1 Aug. 22, 2019

(30) Foreign Application Priority Data
Sep. 20, 2016 (EP) .................................. 16189663

(51) Int. Cl.
*A23G 9/08* (2006.01)
*A23G 9/20* (2006.01)
(Continued)

(52) U.S. Cl.
CPC ................. *A23G 9/28* (2013.01); *A23G 9/08* (2013.01); *A23G 9/20* (2013.01); *A23G 9/22* (2013.01);
(Continued)

(58) Field of Classification Search
CPC ... A23G 9/08; A23G 9/20; A23G 9/28; A23G 9/22; A23G 9/224; A23G 9/228;
(Continued)

(56) References Cited

U.S. PATENT DOCUMENTS 6,264,066 B1   7/2001 Vincent et al.
8,123,075 B2 *  2/2012 Kadyk ................... A23G 9/045
                                                    222/129.1

(Continued)

FOREIGN PATENT DOCUMENTS

EP       1955954      8/2008
WO    2015004552      1/2015

*Primary Examiner* — Frederick C Nicolas
(74) *Attorney, Agent, or Firm* — K&L Gates LLP

(57) ABSTRACT

A container contains a food product to be dispensed, the container volume being closed by a closure and including an identification member; the container being further provided with an engagement member designed to engage with a corresponding driving member to displace the identification member according to a certain pre-defined path in order to allow its reading. A device is operable with such a container, the device has a driving element and a reader, the driving element engaging with the container to displace the identification member according to a certain pre-defined path with respect to the reader. A system prepares cold or frozen dessert products from a fluid contained in a container, the system has a container and a device operating it.

12 Claims, 25 Drawing Sheets

(51) Int. Cl.
  *A23G 9/22*   (2006.01)
  *A23G 9/28*   (2006.01)
  *B65D 25/34*  (2006.01)
  *B65D 51/20*  (2006.01)
  *B65D 85/78*  (2006.01)

(52) U.S. Cl.
  CPC ............. *A23G 9/224* (2013.01); *A23G 9/228* (2013.01); *B65D 25/34* (2013.01); *B65D 51/20* (2013.01); *B65D 85/78* (2013.01); *B65D 2203/06* (2013.01); *B65D 2251/0018* (2013.01)

(58) Field of Classification Search
  CPC ........ B65D 25/34; B65D 51/20; B65D 85/78; B65D 2203/06; B65D 2251/0018
  See application file for complete search history.

(56) References Cited

U.S. PATENT DOCUMENTS

| | | | | |
|---|---|---|---|---|
| 8,210,093 B2* | 7/2012 | Knepler | ................ | A47J 31/402 222/1 |
| 8,322,570 B2* | 12/2012 | Beavis | ................ | A47J 31/525 222/52 |
| 8,333,301 B2* | 12/2012 | Doglioni Majer | .... | A47J 31/401 222/1 |
| 8,540,119 B2* | 9/2013 | Gunstad | ................ | G07F 11/50 222/167 |
| 2013/0064937 A1 | 3/2013 | Jarisch et al. | | |
| 2016/0165920 A1* | 6/2016 | McGill | ................ | A23G 9/285 222/144.5 |
| 2019/0270555 A1* | 9/2019 | Noth | ................ | B65D 85/72 |

* cited by examiner

CONTAINER, DEVICE AND SYSTEM

CROSS REFERENCE TO RELATED APPLICATIONS

The present application is a National Stage of International Application No. PCT/EP2017/073086, filed on Sep. 14, 2017, which claims priority to European Application No. 16189663.4, filed on Sep. 20, 2016, the entire contents of which are being incorporated herein by reference.

FIELD OF THE INVENTION

The present invention relates to a container comprising identification means to be read in order to properly dispense and process the content of the container for the preparation of a food pr beverage product. The invention further relates to a device operable with such a container and to a system comprising a container and an operating device.

BACKGROUND OF THE INVENTION

The present invention is particularly related to the field of devices or machines used in the preparation of cold and frozen desserts at home, such as ice-creams, sorbets, whipped yoghourts, smoothies or the like. Typically, for these machines, the initial product comes in a packaging, from where it is dispensed into a receptacle where it is processed, typically by cooling/freezing and/or by stirring so that the product reaches a final temperature, texture and air content, before it is consumed.

The packaging used to contain the initial product is typically aseptically filled and is then sealed with a closure, typically a flexible lid or film. This makes it possible that, once out of the aseptic area, the packaging is sterile and can be kept ambient for long periods (typically, for several months) thanks to light and gas barriers in the packaging.

When used by the end consumer, this packaging has to be opened to deliver the product into the machine or device to allow its preparation. In order to simplify the consumer experience, it would be desirable that this operation is done fully automatically, so the consumer would only be asked to place the container in the machine or device.

Present solutions existing in the state of the art provide containers with closures where all the operations that need to be carried out, such as opening the lid or membrane (typically by piercing), opening and later closing of the container before it is removed from the machine in order to avoid dripping, can be done in a fully automatic way. Moreover, it would be further desirable to read a code in the container comprising the parameters for the process to be carried out in the machine. In order to rationalize the machine and the operations to be carried out, it would be desirable to use the same operation for the opening or closing the packaging and/or piercing it, also for reading or scanning such a code, thus lowering the number of components needed in the machine or device and, as a consequence, the complexity and the price for the consumer.

Furthermore, the packaging needs to comply with further requirements, such as:

Robustness: the pack should be highly resistant to any hard condition that may happen before the product consumption, be it vibrations, shocks or pressures during transport and storage as well as drops or unintentional wrong manipulations by the consumer.

Hygiene—before use: the zones of the packaging where residuals or hollow bodies such as dust or insects could stay and end in the product should be extremely limited.

Hygiene—during use: the product dispensing should occur in a controlled manner directly into the machine or into a processing container.

Hygiene—after use: even if the initial packaging will be mostly emptied after use, a residual volume of product might remain in it; hence, this packaging should be closed and hermetic to any remaining product at the end of the process, to avoid any product dropping when the packaging is removed from the machine.

As a conclusion, several functions have to be realized, and rather than addressing each of them separately, the aim of the present invention is to provide a system that is able to address them all simultaneously.

OBJECT AND SUMMARY OF THE INVENTION

According to a first aspect, the invention relates to a container 20 comprising in its inner volume a food product to be dispensed, the container volume being closed by a closure 21 and comprising identification means 22: the container 20 is further provided with means designed to engage with corresponding driving means to displace the identification means 22 according to a certain pre-defined path in order to allow its reading.

Preferably, the container 20 comprises at least an area of revolution and is moved in rotation allowing rotational displacement of the identification means 22 to be read.

The means in the container are typically configured as gears engaging with corresponding driving gears to allow rotational displacement of the container 20.

Preferably, the container of the invention further comprises a cap assembly 10 provided with gears. According to one embodiment, the cap assembly 10 comprises two parts 11, 12 relatively moveable with respect to each other, one of the parts comprising gears allowing at least partial rotation of the container.

Typically, the identification means 22 in the container of the invention are optical identification means such as a barcode, a 2D barcode or any optically readable code. These identification means preferably comprise data of the food product inside the container 20 and/or processing parameters to prepare said food product. The food product is typically a fluid from which a chilled or frozen product may be prepared.

The container of the invention can be configured as compressible and shaped as a bottle, a pouch, a capsule, a pod or a thermoformed container. According to a possible embodiment, the container 20 is shaped as a partially collapsible bottle, comprising a collapsible part 202 and a retaining part 201, the collapsible part 202 being configured to collapse at least partially inside the retaining part 201 by the application of pressure substantially in a direction of the container longitudinal axis.

Preferably, the container 20 is configured to collapse by inverting its shape and conforming to substantially the inner shape of the retaining part 201 in order to allow the dispensing of the fluid inside the container.

According to a second aspect, the invention further relates to a device operable with a container 20 as described, the device comprising a driving element 31 and a reader 33: the driving element engages with means in the container 20 to displace the identification means 22 according to a certain pre-defined path with respect of the reader 33.

Preferably, the reader (33) is stationary and is able to read information on identification means (22) travelling in front of it.

The device of the invention typically further comprises an actuation device 80 configured to apply a pressure substantially parallel to the container longitudinal axis 110 in order to allow dispensing of the fluid inside.

The actuation device typically comprises a piston having a shape substantially the same as the inner shape of at least part of the container, once it has been deformed to dispense the fluid inside.

According to yet another aspect, the invention relates to a system for preparing cold or frozen dessert products from a fluid comprised in a container, the system comprising a container 20 as the one described and a device operating it.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF EXEMPLARY EMBODIMENTS

Figure 1:
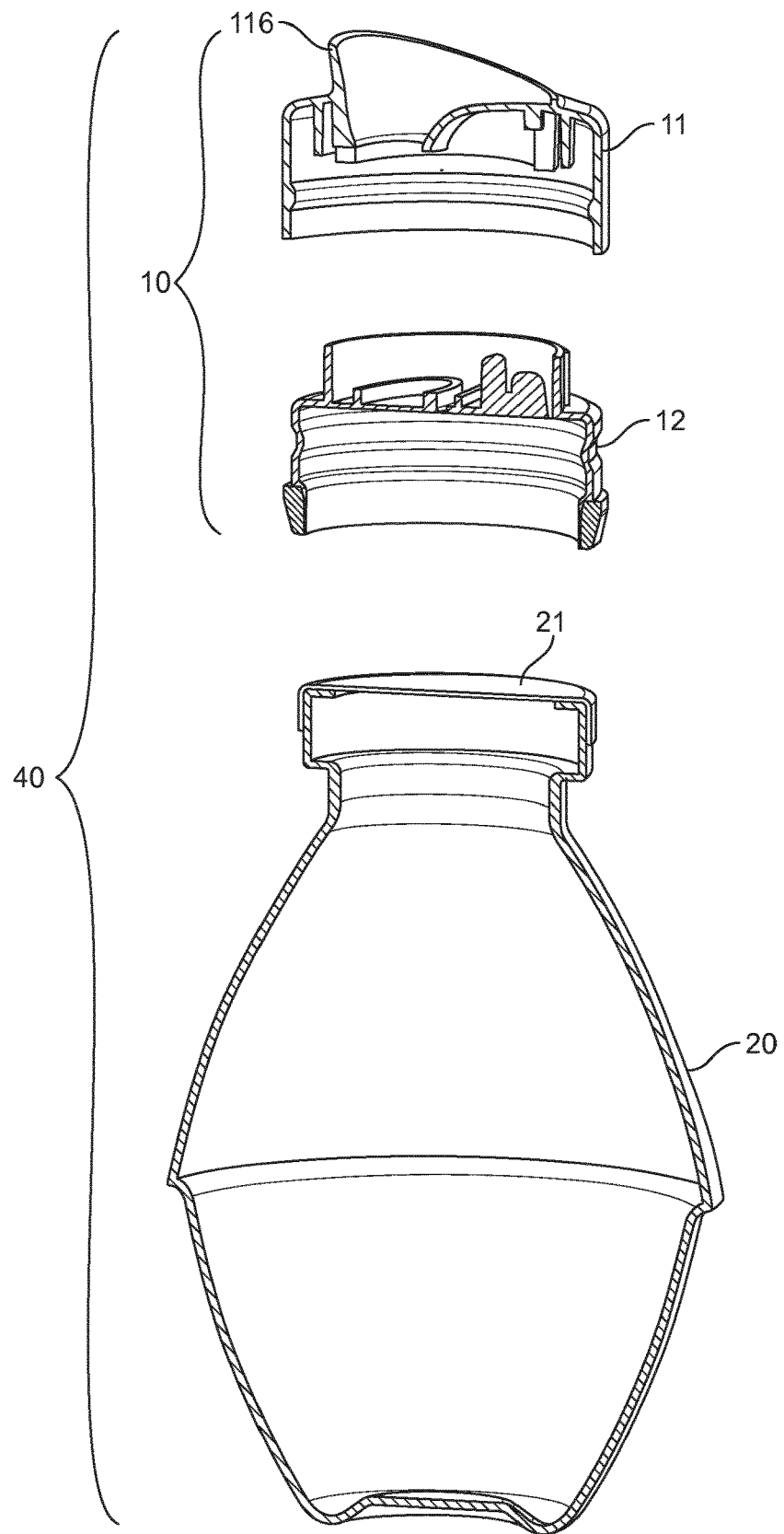
FIG. 1 shows a sectional view of a container comprising a cap assembly according to a possible embodiment of the present invention.

The present invention relates to a container 20 that can be provided with a cap assembly 10: the container 20 is typically flexible or at least partially flexible, and comprises in its inner volume a food product to be dispensed. The food product dispensed is then processed in a device or machine (typically by being stirred and aerated) in order to prepare a cold or frozen dessert from it, such as an ice-cream, a sorbet, a whipped yoghourt, a smoothie or the like.

The container 20 is aseptically filled with the food product and is then sealed by means of a closure, typically a lid or a film 21, preferably made of aluminum, to preserve the product inside for long storage periods. Then, after the container 20 has been sealed with the lid 21, the cap assembly 10 is arranged over the container's neck. The cap assembly together with the container constitute together a so called container system 40. Other more simple systems of a container comprising inside a product to be delivered are also possible and comprised in the scope of the present invention.

Preferably, the container 20 comprises a cap assembly 10 is designed in such a way that, when arranged on the container, by applying a rotation to it, reading of a code that contains information on the product or parameters of the process to be applied for its preparation occurs. Moreover, the following further functions could also be provided:

opening/closing a physical channel communicating two parts of the cap, as it will be further explained, so as to communicate with the inner volume of the container;

opening the lid or film closing the container 20 (typically by piercing).

The cap assembly 10 typically comprises two parts, moveable with respect to each other, typically rotatable with respect to each other. These parts are a primary part 11 and a secondary part 12. The rotation of these two parts relative to each other or their solidary rotation can provide the functions of code reading and/or opening the lid and opening and/or closing of a physical channel communicating both and the inner volume of the container, as it will be further described.

In general terms, the container of the invention is configured in such a way that it moves and displaces identification means comprised in it according to a certain predefined path that makes these identification means travel in front of a reader in a corresponding device: the reader can therefore obtain the information in these identification means, needed for the product information and/or for the corresponding processing of such product in the device.

These parts 11, 12 are typically injected and then assembled by clipping to form the cap assembly 10.

Figure 2:
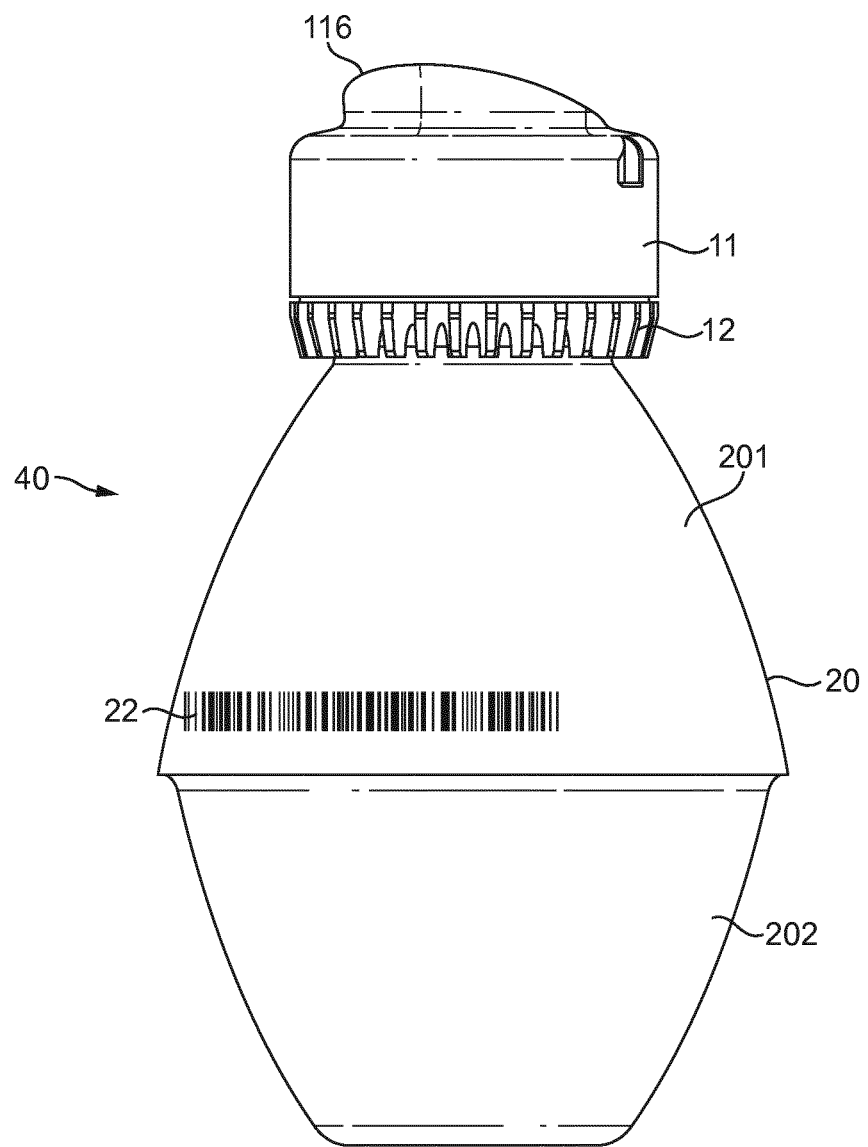
FIG. 2 shows a schematic view of a container according to a possible embodiment of the invention.

FIGS. 1 and 2 show the two parts 11, 12 of a cap assembly 10, arranged over the neck of a container 20. The container 20 further comprises identification means 22, preferably optical identification means, such as for example a barcode, a 2D barcode or any optically readable code applied on the container or on the cap assembly, preferably comprising the data of the food product inside and of the processing parameters to follow in a device or machine for its correct preparation. These identification means 22 can also be arranged on the cap assembly 10.

In the Figures attached, the container has been represented as a bottle, though it can also adopt other shapes, such as a flexible pouch, a capsule, a thermoformed container, or the like. Typically, the bottle where the cap assembly 10 is arranged, is a flexible bottle, preferably a partially collapsible bottle, comprising a retaining part 201 and a collapsible part 202. The collapsible part 202 is configured to collapse at least partially inside the retaining part 201 by the application of pressure substantially in a direction of the longitudinal axis of the container. Typically, the collapsible part 202 is configured to collapse by inverting its shape and conforming to substantially the inner shape of the retaining part 201 in order to allow the dispensing of the food product (typically a fluid) inside the container 20.

Figure 3A:
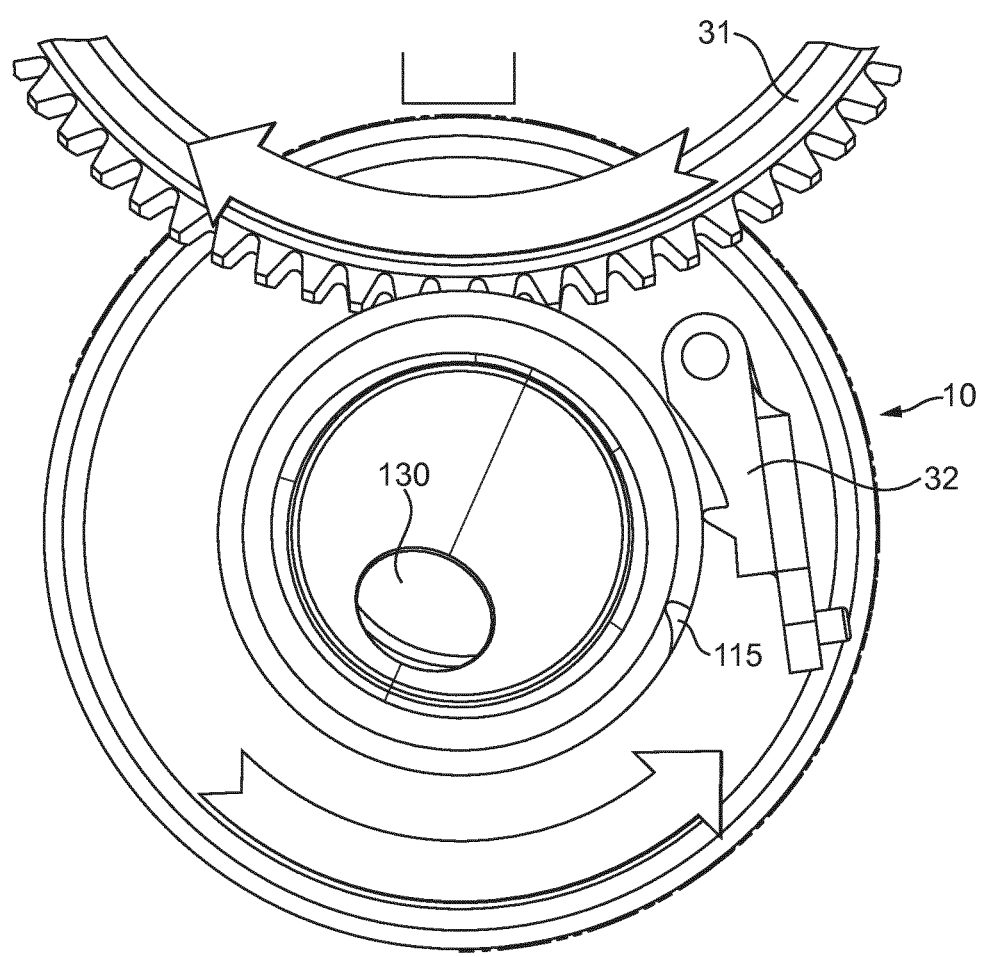
FIGS. 3a-c show various steps in the driving in rotation of a cap assembly in a container according to a possible embodiment of the invention.
Figure 3B:
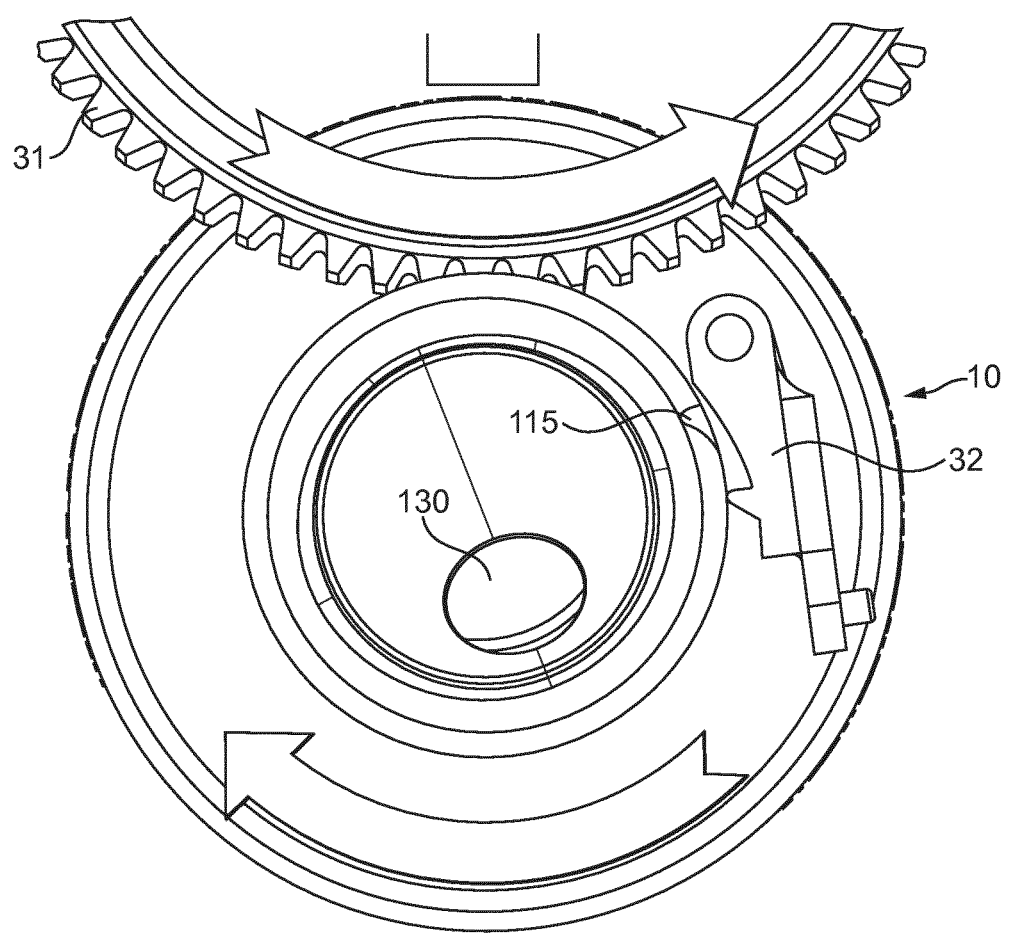
Figure 3C:
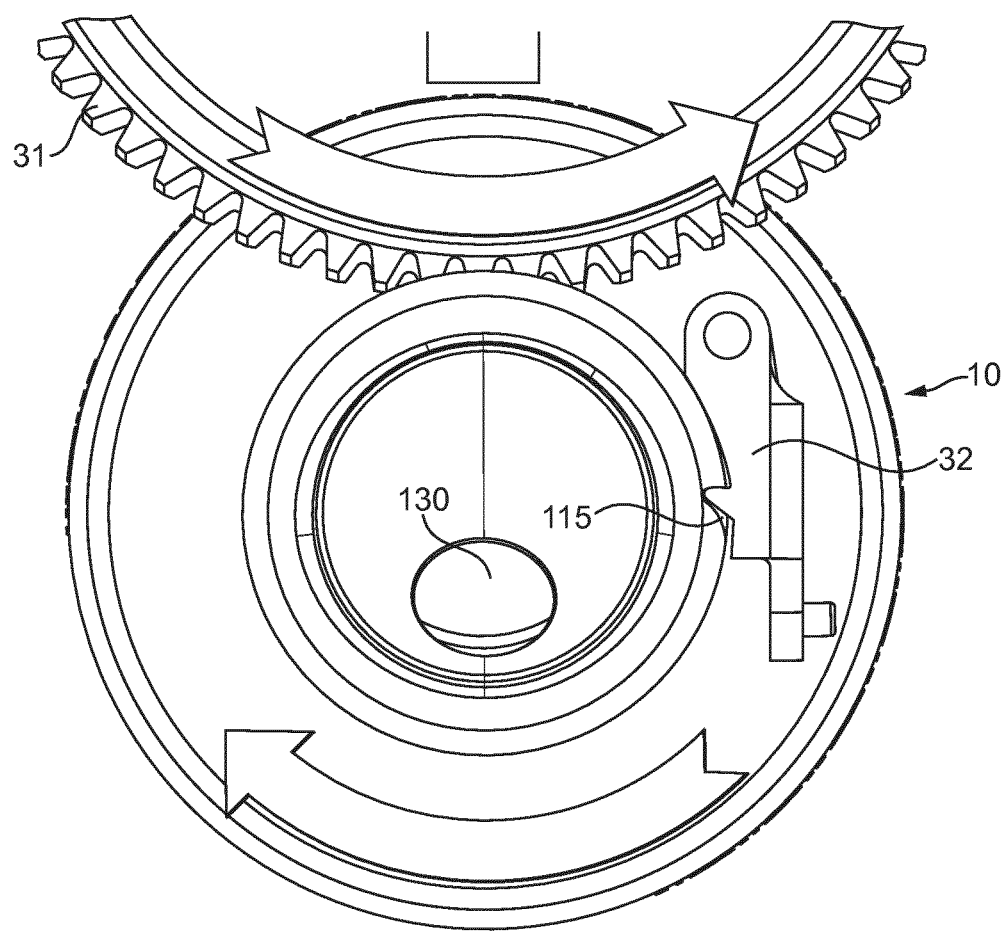

The primary part 11 and the secondary part 12 of the cap assembly 10 and their relative movement is further represented in detail in FIGS. 3a-c. A driving element 31 of a preparation machine, typically a gearing element, drives in rotation the secondary part 12 of the cap that will turn accordingly. This rotation will have the following impact in the other parts of the container system 40:

as the secondary part 12 is attached to the container 20, the container will turn together with this secondary part 12, considering that no other torque is applied on the container; this will allow the scanning of a code 22 typically printed on the container by a sensor 33 placed at a fixed location in the machine;

as the two parts of the cap assembly are joined together, the cap primary part 11 can either turn simultaneously together with the secondary part 12, when it is left free and has no other torque applied to it, or it can be blocked by a retention element 32 in the machine side engaging with a corresponding groove 115 in this primary part 11, so the secondary part 12 will rotate with respect to the primary part 11 (as the primary part 11 has been blocked or fixed from moving by its groove 115 connecting to the retaining element 32), thus ensuring the functions of: opening and/or closing a physical channel 130 formed between an aperture 110 in the primary part 11 of the cap and an aperture 120 in the secondary part 12 of the cap (appearing once the piercing element 125 has been moved or pushed downwards so an open space is created communicating with the inner volume of the container), the physical channel 130 communicating the cap assembly 10 with the inner volume of the container 20; and opening by piercing the lid 21.

These three functions will be now described in more detail in what follows.

Figure 4:
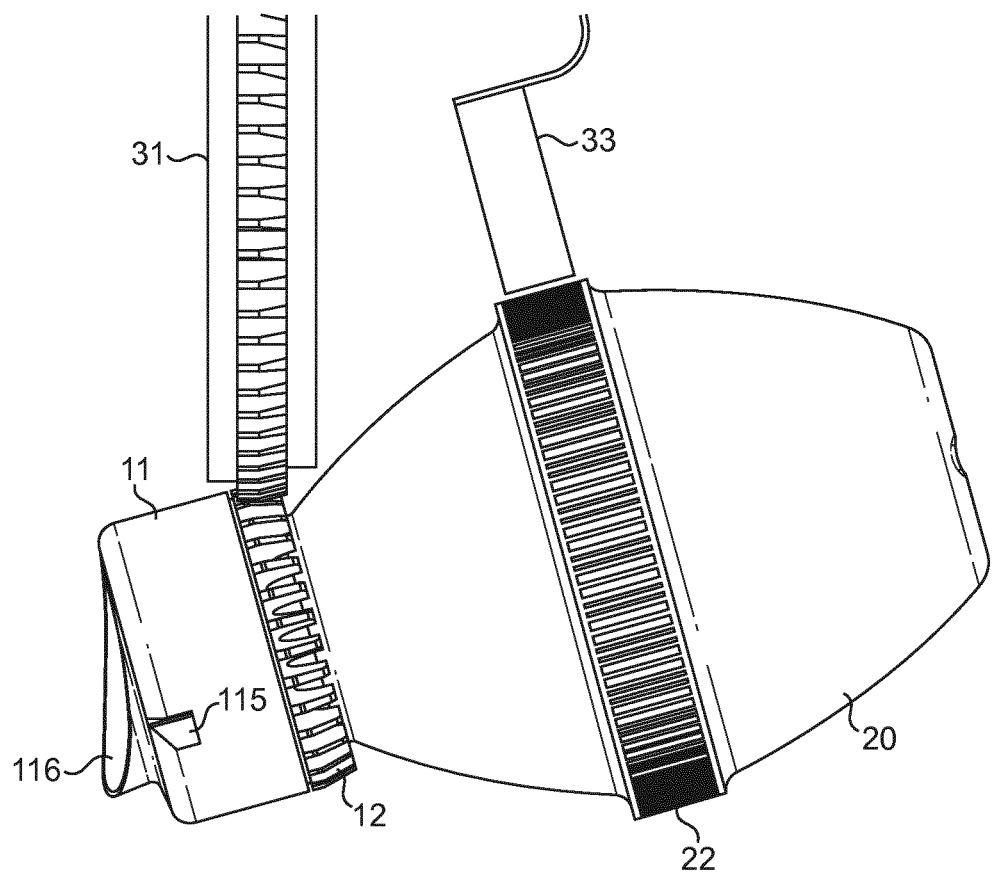
FIG. 4 shows a schematic view of the reading of a code arranged in the container by a sensor in a preparation machine or device, in a system according to the present invention.

As schematically represented in FIG. 4, the rotation of the container 20, induced by the cap secondary part 12 to which it is attached, will make a code 22 printed on the external part of the container 20 travel in front of a sensor 33 fixed in the machine. It is the code 22 that travels in front of the sensor: this removes the need to have a moving sensor system, and allows using a small sensor to cover a large surface of code, in order to have a large quantity of information, so the system is made simpler and less costly.

The function of opening the lid 21 is done preferably by a piercing element 125, typically arranged on the lower side part of the secondary part 12 of the cap. This piercing element 125 is typically a flexible sub-part of the secondary part 12 of the cap, as represented on FIG. 5 or 6. Typically, this piercing element 125 is linked to the rest of the secondary part 12 by a thin part of plastic that acts as a hinge. As a consequence, under a certain force, the piercing element 125 will rotate and be pushed downwards onto the lid 21: as the lid 21 is located very close below the piercing element 125, it will consequently be pierced during this operation. Besides, In order to initiate the piercing, the piercing element 125 is designed with sharp tips or ends.

Figure 5:
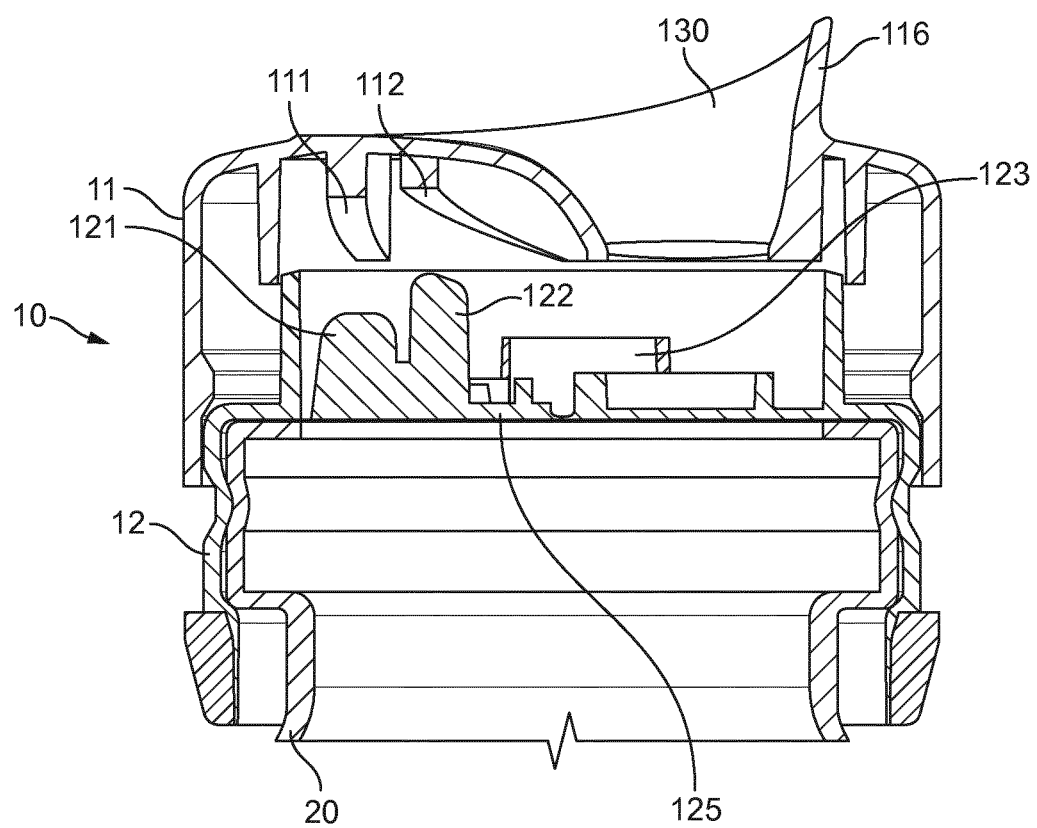
FIG. 5 shows a sectional view of the main elements forming the two parts of a cap assembly that can be mounted on a container according to the present invention, showing a position where the two parts are not mounted yet, for better understanding their components.
Figure 6:
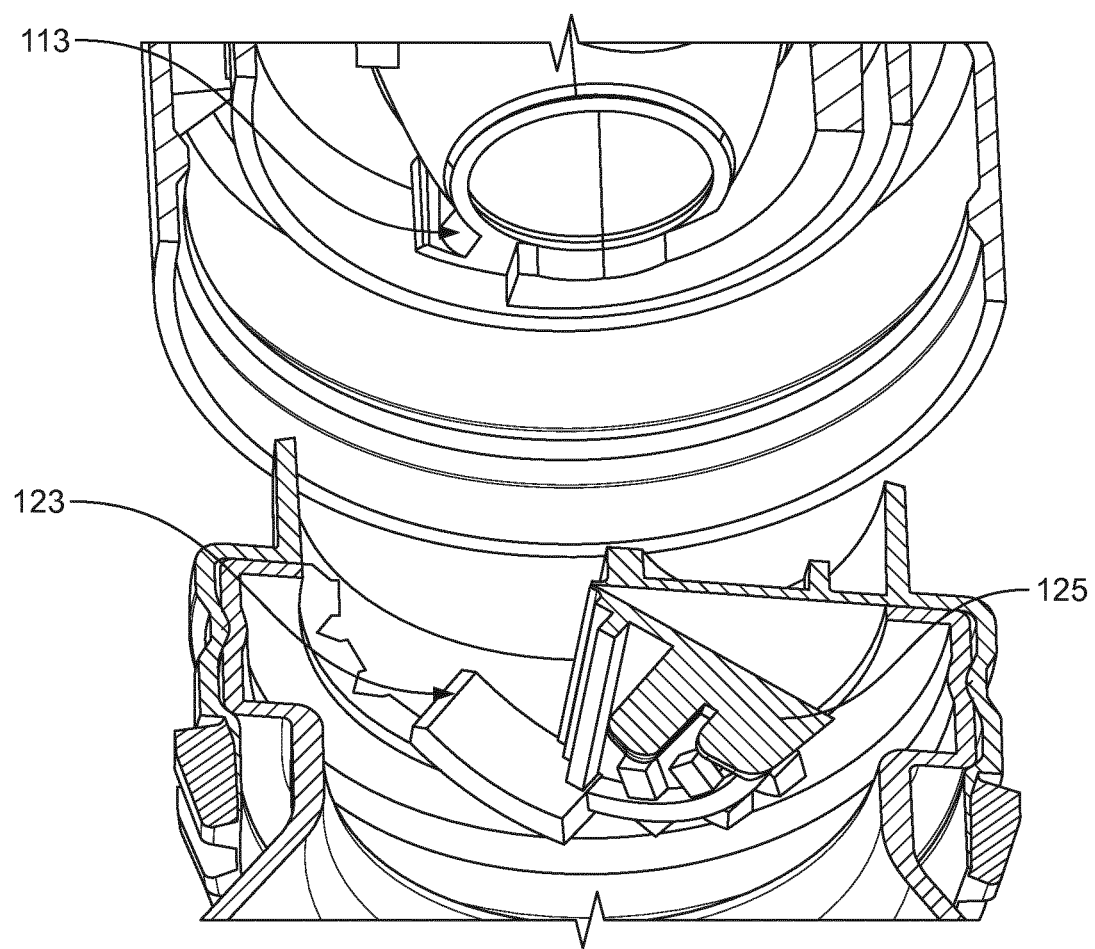
FIG. 6 shows representative views of the two parts configuring a cap assembly that can be mounted on a container according to the present invention.
Figure 7A:
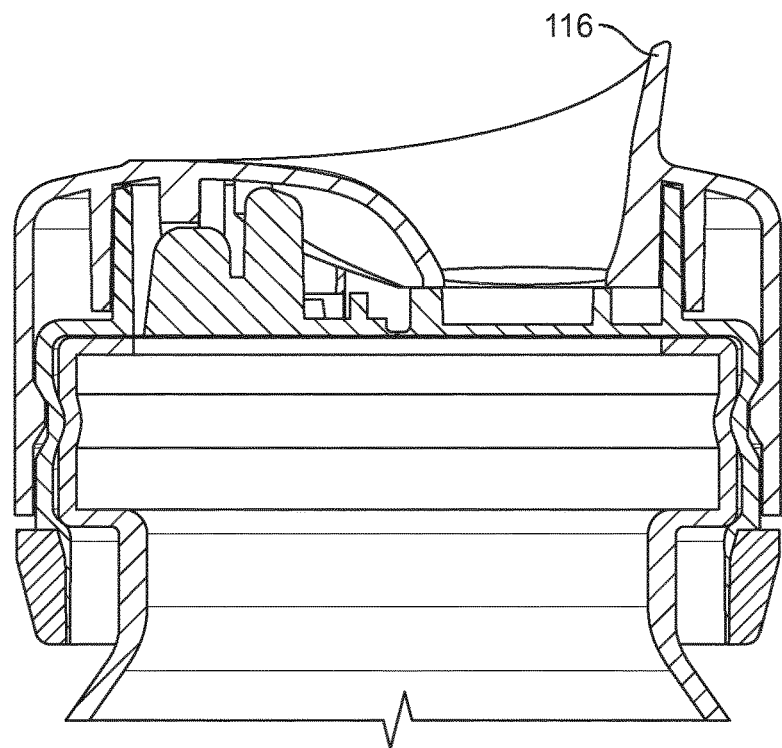
FIGS. 7a-j show different representative views of the two parts configuring a cap assembly that can be mounted on a container according to the present invention, showing different steps in the piercing of the lid arranged on the container.
Figure 7B:
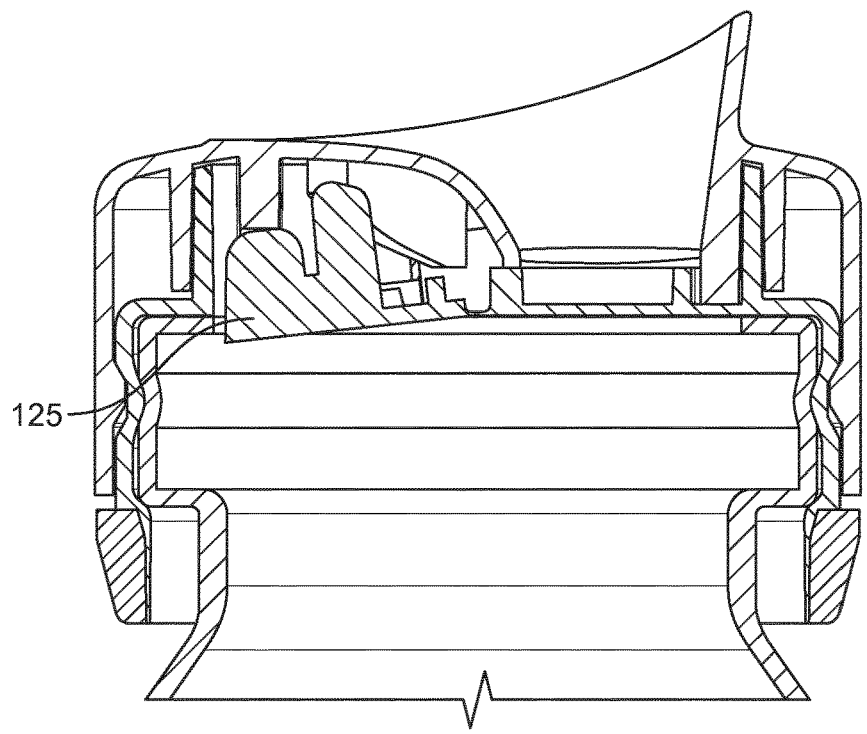
Figure 7C:
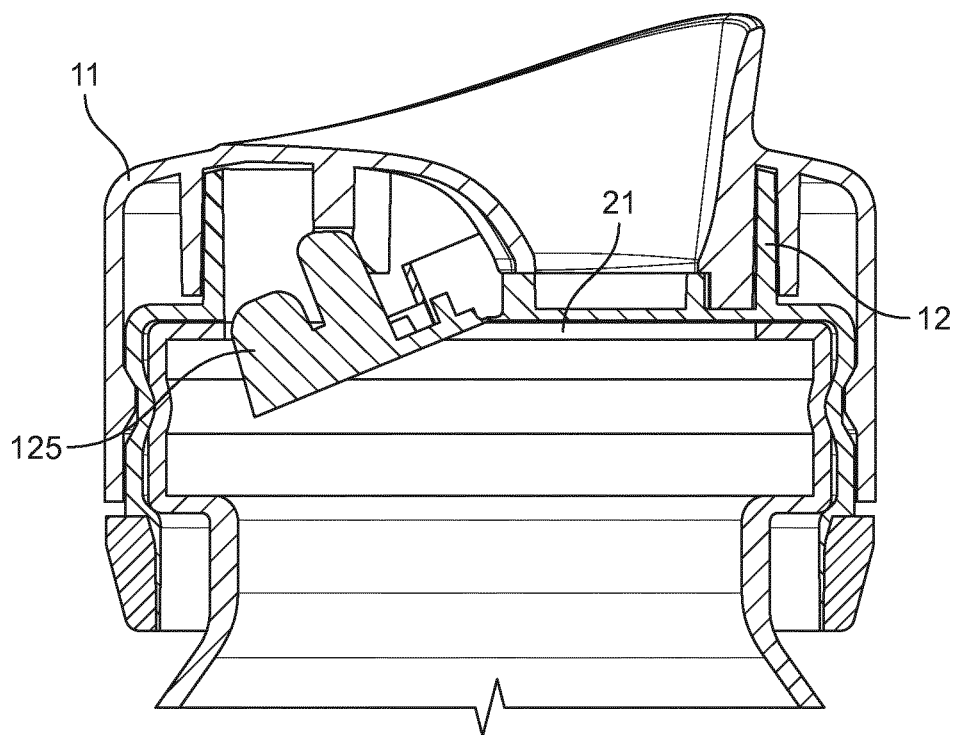
Figure 7D:
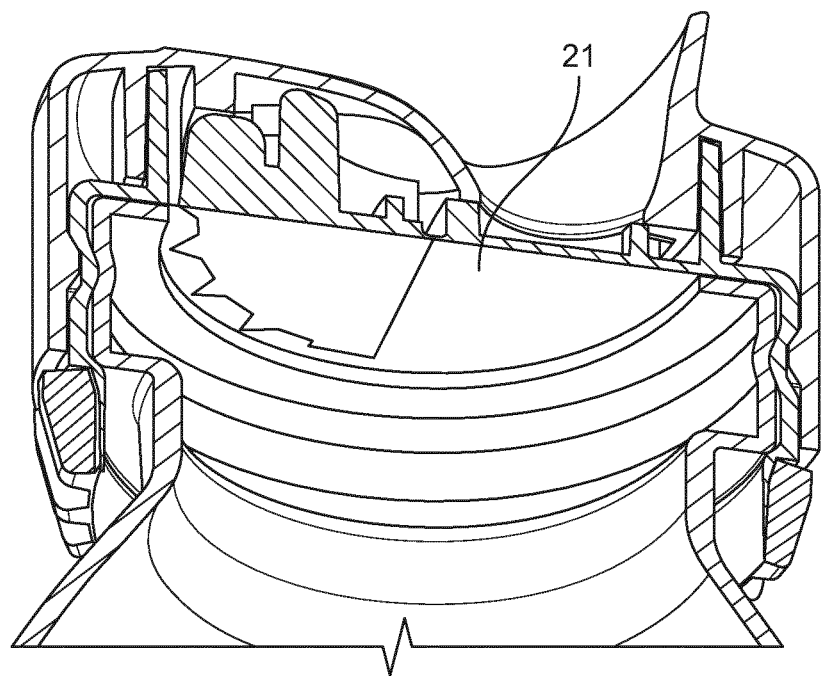
Figure 7E:
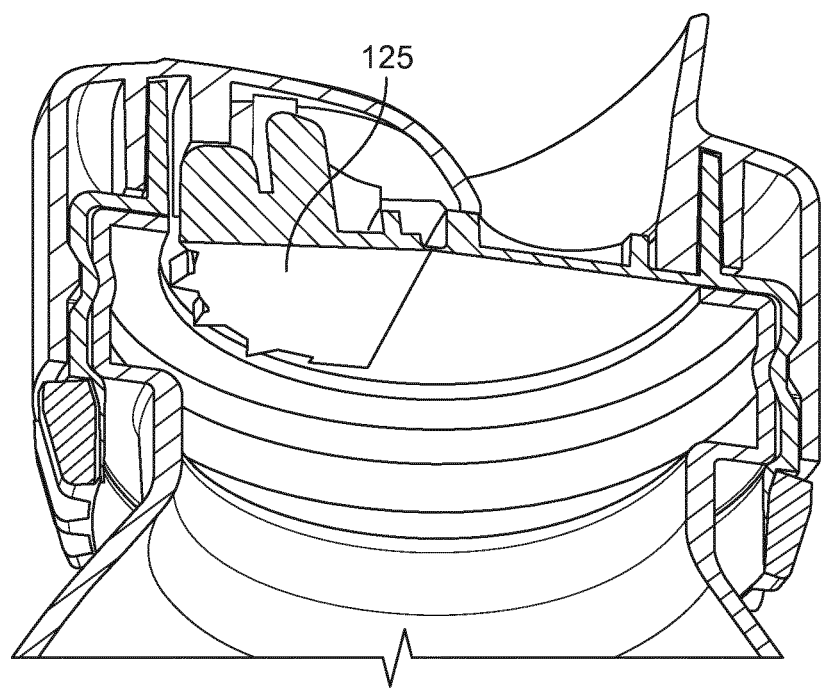
Figure 7F:
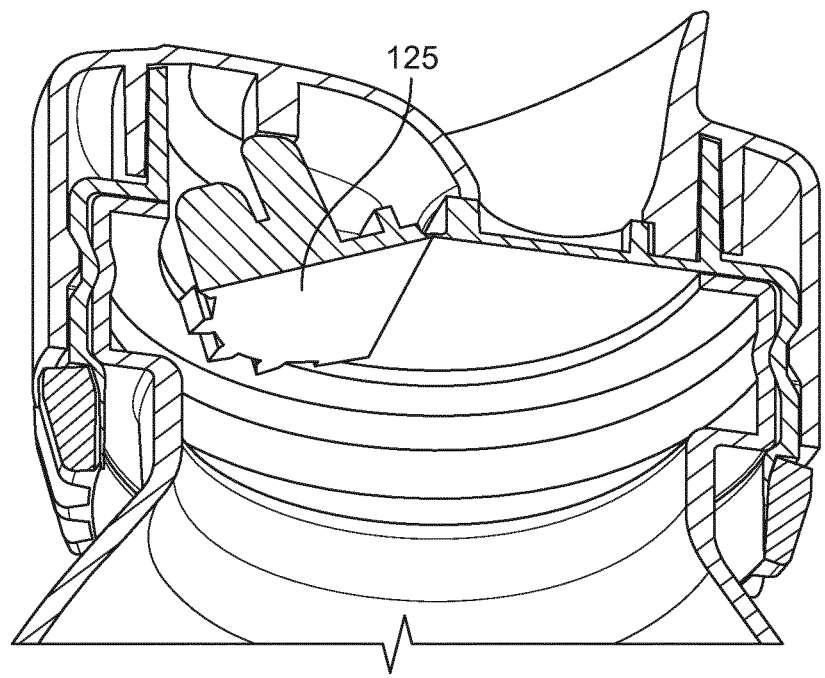
Figure 7G:
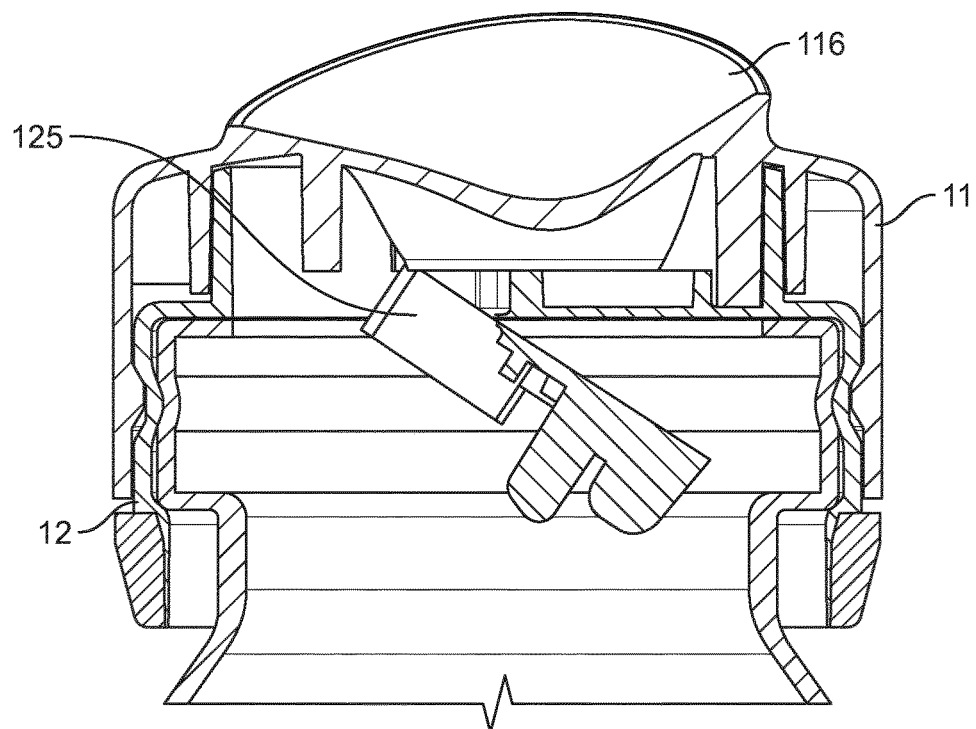
Figure 7H:
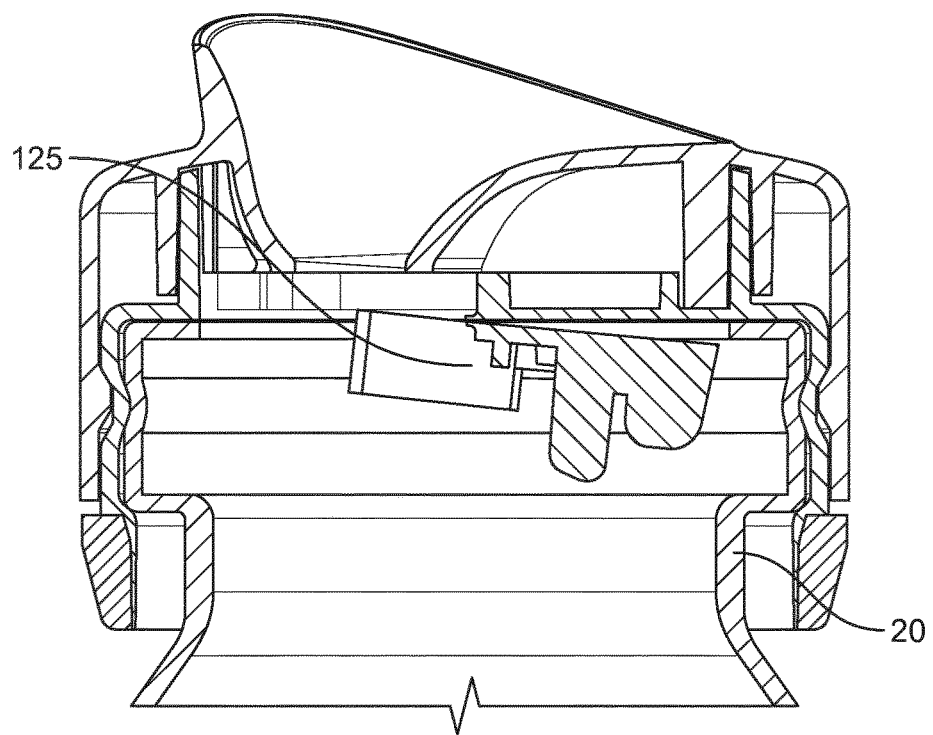
Figure 7I:
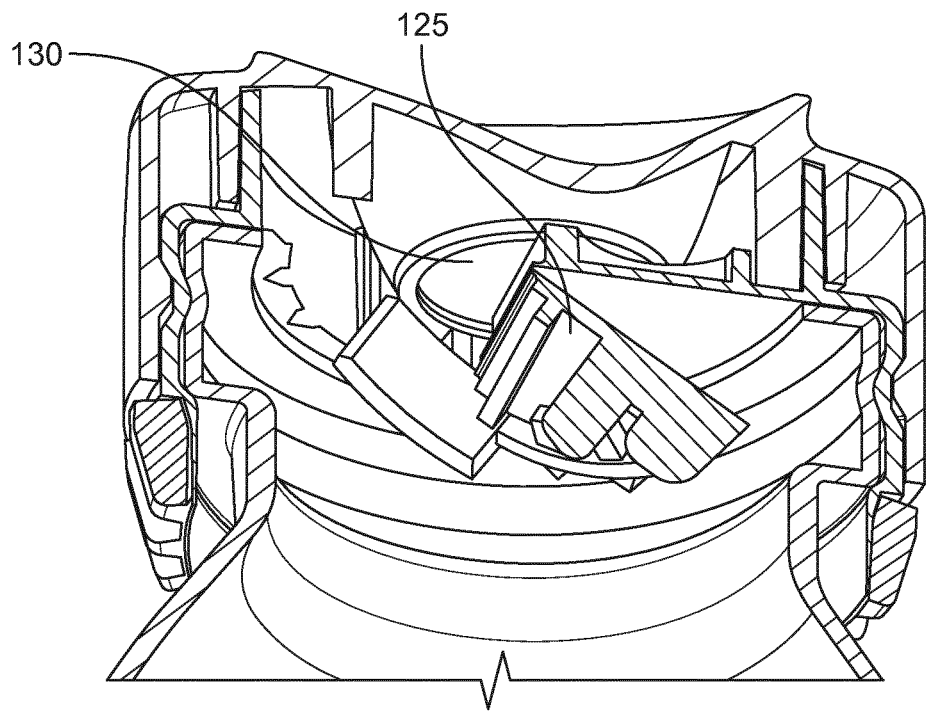
Figure 7J:
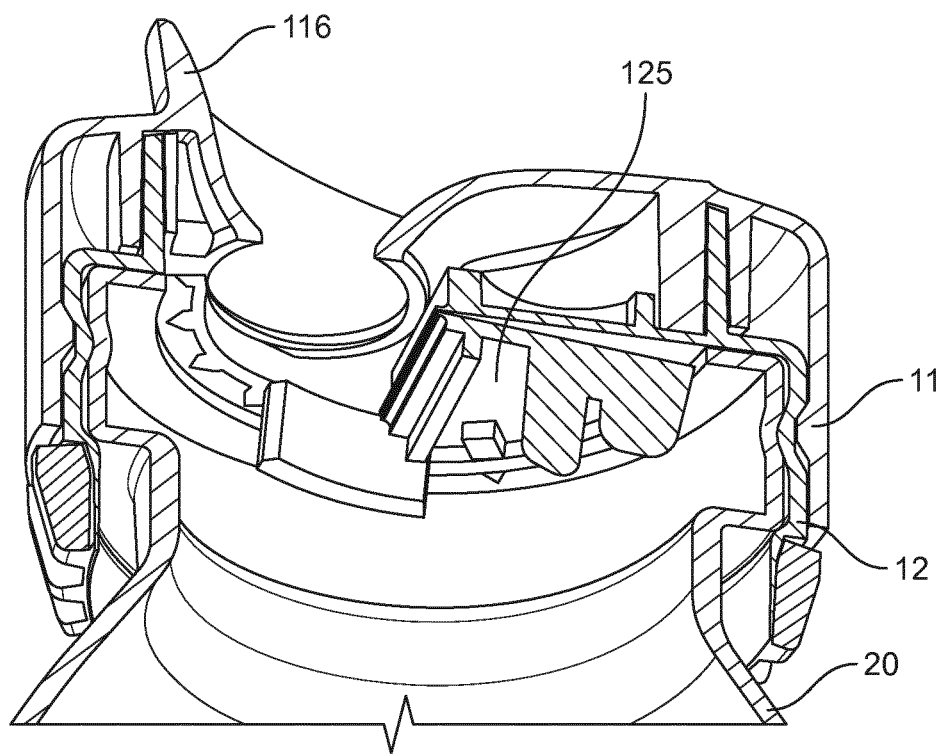

The actuation itself is done by one or more ramps and complementary ramp followers arranged on the primary part 11 and on the secondary part 12 of the cap assembly 10, respectively. Typically, as represented in FIGS. 5 and 6, the primary part 11 of the cap comprises two ramps, a primary ramp 111 and a secondary ramp 112, though other configurations are also possible. Matchingly, the secondary part 12 of the cap comprises corresponding ramp followers, typically a primary ramp follower 121 and a secondary ramp follower 122. With such configuration, the primary and secondary parts 11, 12 will slide on each other and will sequentially induce the forces needed to push the piercing element 125 downwards so as to pierce the lid 21, opening it to allow dispensing of the product inside the container 20. Therefore, the matching ramps and ramp followers dictate the path to follow for the movement of the primary and secondary parts relative to each other. This movement is shown in different several consecutive steps in attached FIGS. 7a-j. The rotation of the two parts of the cap with respect to each other is preferably further guided with a tertiary ramp 113 in the primary part 11 of the cap and a corresponding matching tertiary ramp follower 123 in the secondary part 12 of the cap.

Figure 8C:
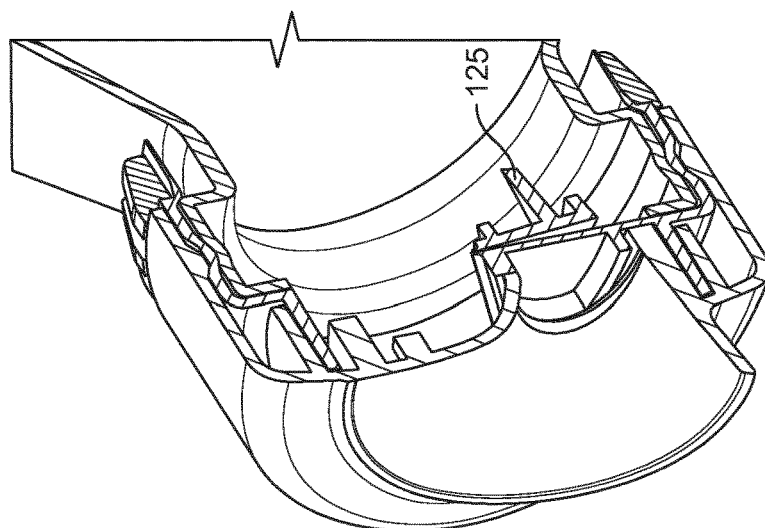
FIGS. 8a-c show sectional views of the two parts of a cap assembly that can be mounted on a container according to the present invention, showing different steps for the opening and/or closing of a product channel.
Figure 8B:
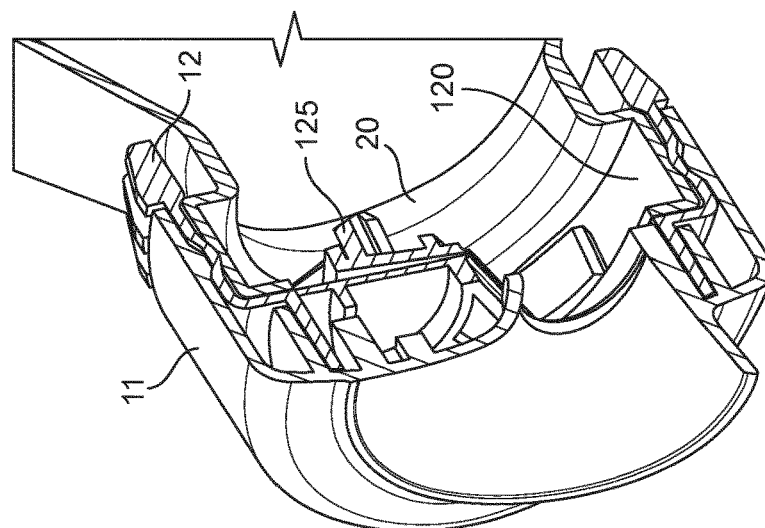
Figure 8A:
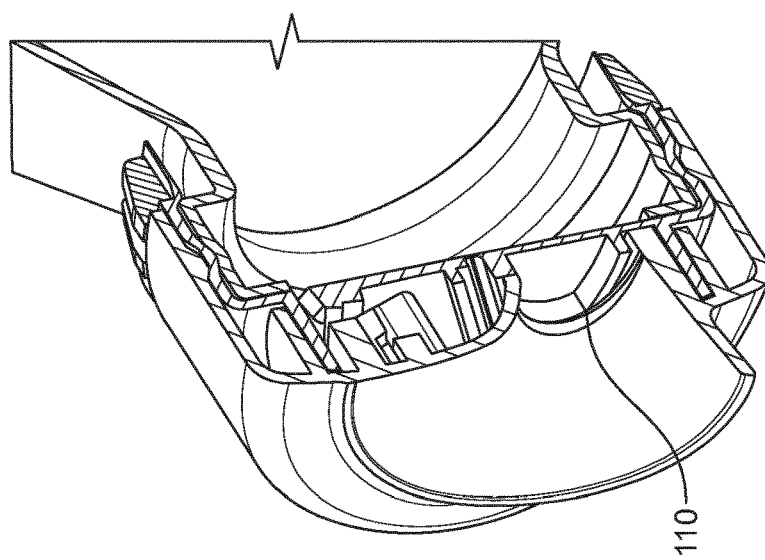

The function of opening and closing the product channel 130 is done by making a correspondence or not between the two apertures or openings 110, 120 in the primary and secondary parts 11, 12 respectively, during the travel of these two parts with respect to each other. This can be seen in FIGS. 8a-c, for example. In fact, it is the piercing element 125, when being pushed downwards, therefore removing the material closing the communication of the secondary part 12 with the inside of the container 20, which creates the aperture 120 that will match with the aperture 110 in the primary part 11 of the cap assembly. This is a preferred configuration, though others would also be possible.

Figure 9:
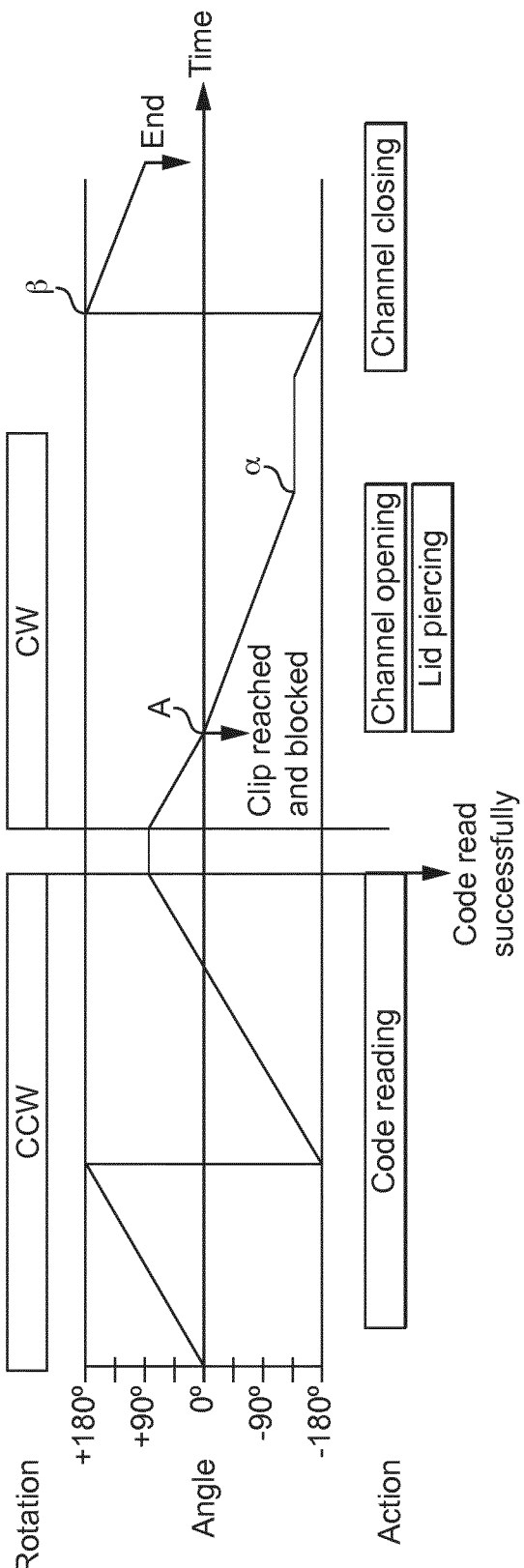
FIG. 9 shows a graph representing the angle of rotation of the two parts of a cap assembly that can be mounted on a container according to the present invention with time, in counter clockwise and in clockwise direction.

In a preferred embodiment of the invention, a sequence of operation of the movement of the container 20 and the cap assembly 10 and its parts 11, 12, is represented in the graph of FIG. 9: in the axis X it is represented time and, in the axis Y, it is represented the angle of rotation of the secondary part 12 of the cap, positive sign for counter clockwise rotation angle and negative sign for clockwise rotation angle. The sequence of movements represented in the graph of FIG. 9 corresponds to the following:

First, the secondary part 12 is turned in counter clockwise direction, entrained in rotation by the driving element 31 (typically, gears) in the machine: the design of the ramps and ramp followers in the parts of the cap assembly 10 is made in such a way that, in counter clockwise direction of rotation, the parts 11 and 12 cannot move with respect to each other but they are obliged to rotate together (typically, by the design of the ramp and the follower, the ramp presents a stop to the follower in counter clockwise direction, allowing sliding of the follower on the ramp in clockwise direction). As the container 20 is joined to the secondary part 12, it will also rotate together with the cap assembly 10, this time in counter clockwise direction. During this rotation, the identification means 22 on the container will travel in front of a reader or sensor 33 in the machine, so the parameters and information on the code will be retrieved by the machine for the preparation process. Typically, the design of the groove 115 is such that it cannot be engaged by the retention element 32 in the machine in counter clockwise direction of rotation, but only in clockwise direction. It is also clear that the groove and retention element can be made to engage or not in clockwise or counter clockwise direction, the invention remaining the same but only the direction of rotation changing.

Only once the code 22 has been successfully read (several turns can be made in the same counter clockwise direction so as to read the code correctly, in case that, for example, in previous turns it has not been well read) then, the direction of rotation is reversed to clockwise direction. The secondary part 12 still rotates together with the primary part 11 (not independently) up to a certain angle when the retention element 32 engages the groove 115 in the primary part, represented as point A in FIG. 9. When this happens, this is detected by a corresponding sensor in the machine, this sensor being linked for example to the retention element 32 or detecting a rising current in the driving motor driving the gears 31. This angle reached in point A is then defined as angle zero reference.

The secondary part 12 is kept turning in clockwise direction and it turns now independently to the primary part 11, engaged by the retention element 32: the secondary part 12 rotates up to a certain predefined angle α: the design of the cap assembly is made such that, when this angle α is reached, the apertures 110 and 120 coincide (so the channel 130 communicating with the inner volume of the container 20 is opened) and the lid 21 has been pierced by the piercing element 125 being forced downwards and rotated to open this lid. In fact, the aperture 120 appears once the piercing element 125 has been pushed downwards, therefore leaving free the communication to the inside of the volume of the container. Therefore, when this angle α is reached, the container (typically, the bottle) can be squeezed or pressed to deliver its content.

The secondary part 12 is kept turning in clockwise direction until a certain pre-defined angle β: this angle β ensures that the cap is closed (i.e. the channel 130 communicating with the inner volume of the container 20 is closed), so no remaining product in the container can be dispensed when the container is removed from the machine, typically for being dispensed.

According to another embodiment of the invention, a container system can be made by a pack or packaging comprising inside a food product to be dispensed, the container system can have any type of cap or lid through which the product will be dispensed. The container system will be provided with means able to engage with corresponding means in the machine so that the identification means in the pack will be able to travel according to a certain predefined path matching with reading means in the machine, so that the information on the identification means can be properly read and processed by the machine to prepare a corresponding food or beverage product. A possible execution can be for example the one described, with a container 20 comprising identification means 22: the container itself or a cap arranged over it can be provided with means to engage corresponding means in the machine (typically, gears 31) in order to make the container 20 move (typically, rotate) and therefore make identification means 22 on it travel in front of a reader or sensor 33, so as to obtain the information of the product and/or the process in order to properly prepare the corresponding food product or beverage.

The described example and way of operation can be done clockwise or counter clockwise, or a combination of both, depending on the needs: the container system 40 will be designed accordingly.

As shown for example in FIG. 6, the cap assembly 10, typically the primary part 11, comprises an outlet 116 with the shape of a beak: this outlet can also be made having a preferred orientation or slope facilitating the dispensing of the product. In such case, the rotation reached by angle α will also ensure that the outlet 116 is oriented accordingly for dispensing, i.e. with the beak sloped towards dispensing.

For the lid piercing and channel opening functions, the relative rotation needed between the two parts of the cap assembly necessarily implies that when a part is being driven in rotation by the machine, the other part is maintained fixed, i.e. it is blocked in rotation. This blocking can either be done:

constantly: by an element of the machine, for example a closing cover or similar, blocking the rotation all the time;

occasionally: with two possibilities to block; actively, where the blocking is done at a selected moment, for example by an electromagnet or a stepper motor; passively, where the blocking is done by a mechanical element, such a flexible clip or a saw teeth profile for example.

Figure 10:
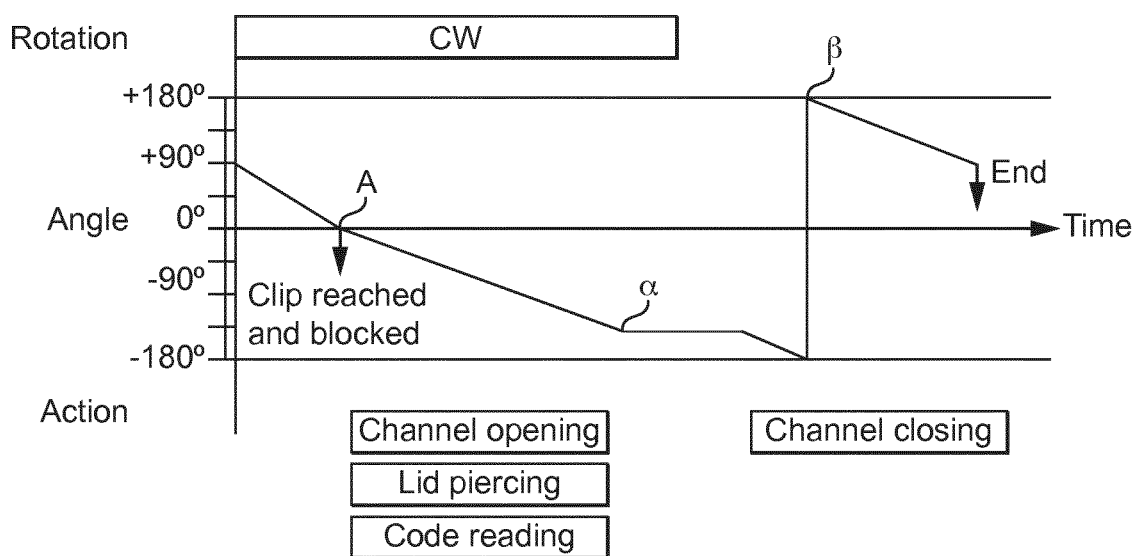
FIG. 10 shows a graph representing the angle of rotation of the two parts of a cap assembly that can be mounted on a container according to the present invention with time, in clockwise direction, according to another embodiment.
Figure 11A:
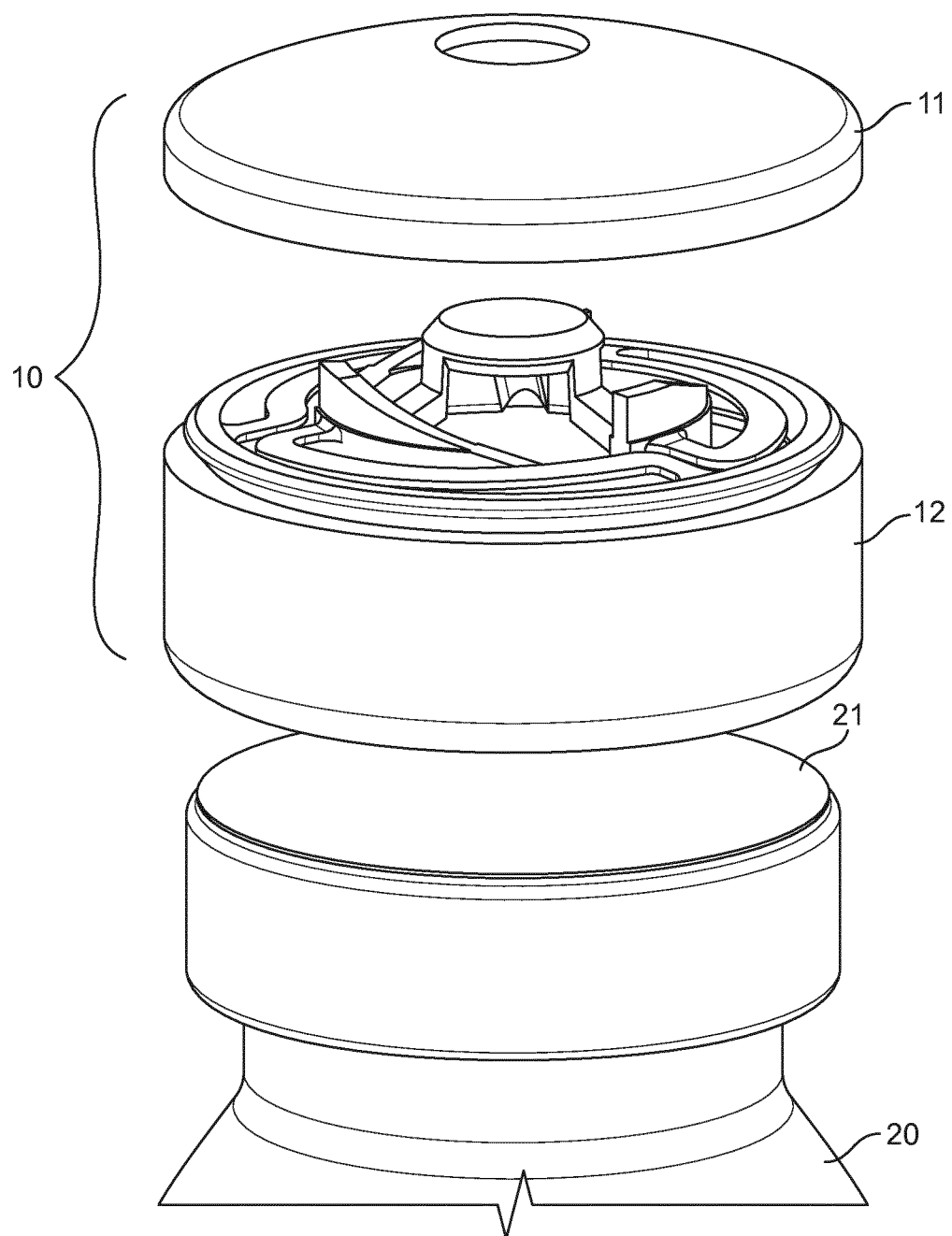
FIGS. 11a-e show different views of the parts configuring a cap assembly that can be mounted on a container according to the present invention, according to another embodiment.
Figure 11B:
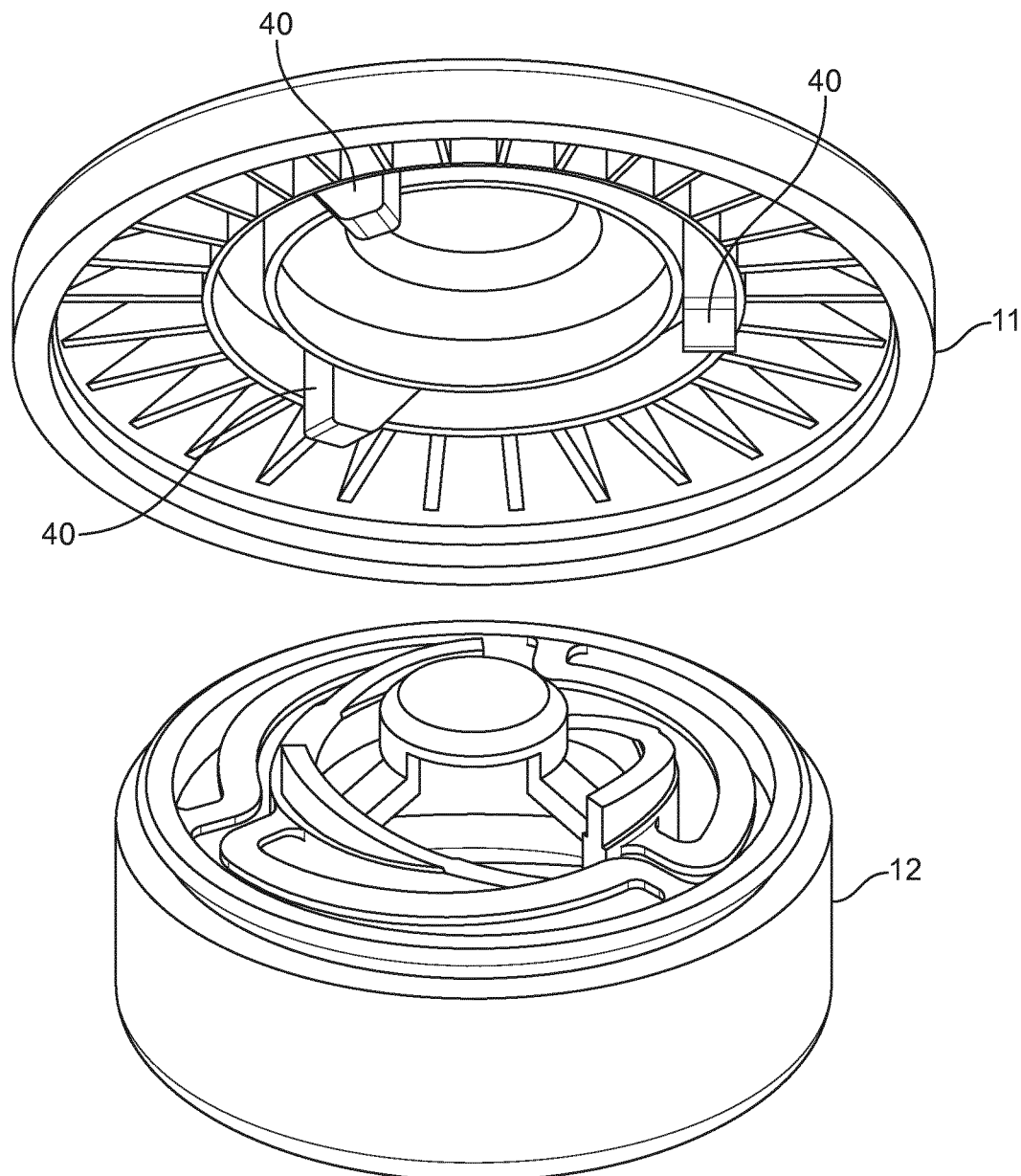
Figure 11C:
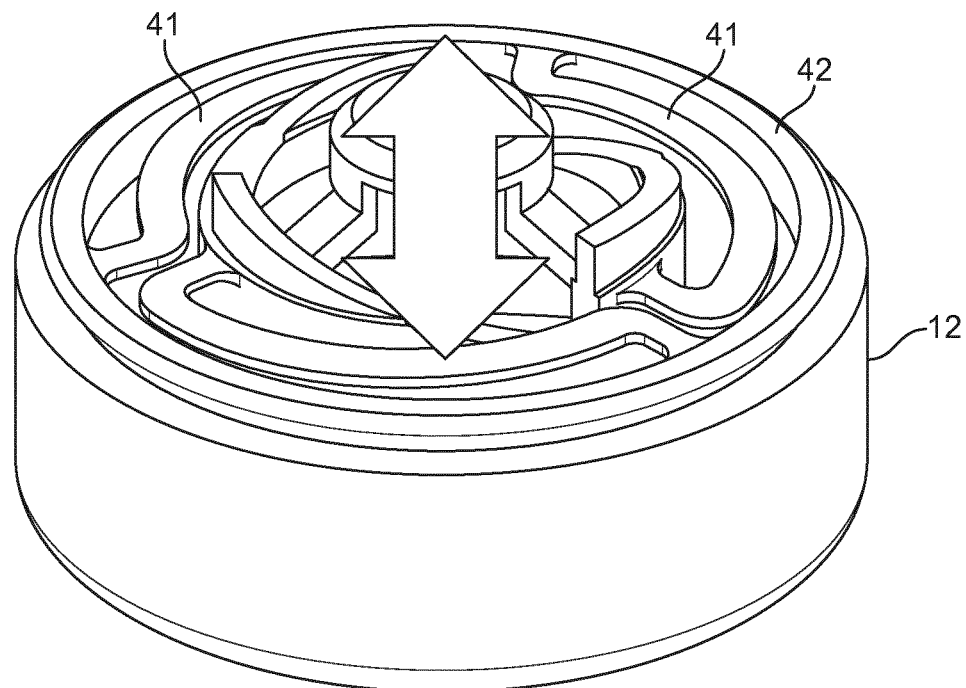
Figure 11D:
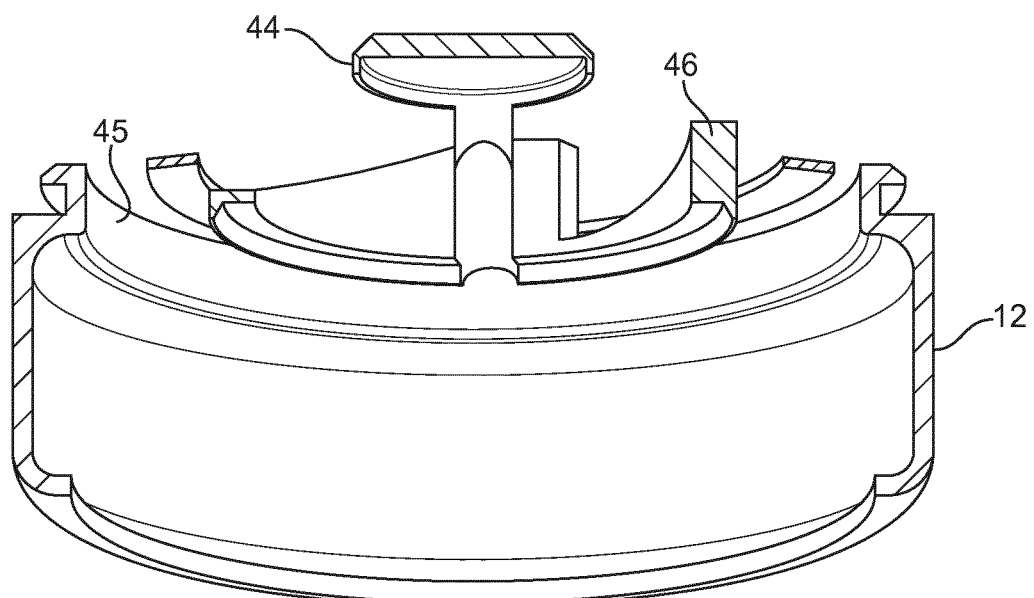
Figure 11E:
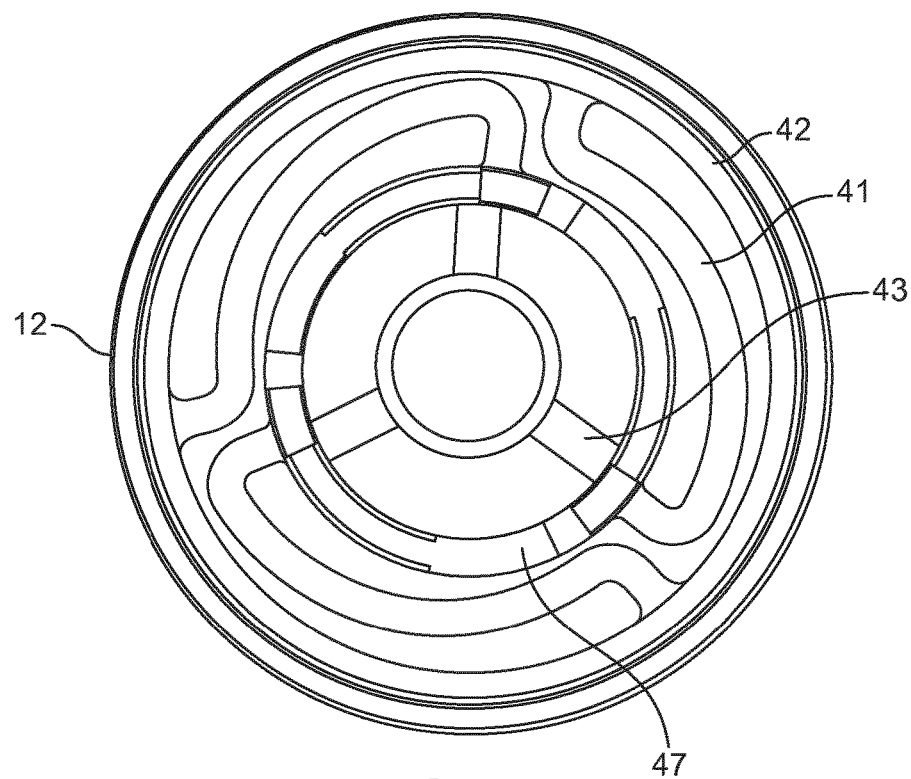

The sequence of operation presented in the graph of FIG. 9 is a preferred example, where code reading in the container is done before the lid is pierced and the channel is opened. However, other options or designs of the cap assembly are possible, to provide these actions in a different order, overlapped and/or simultaneously and/or sequentially; for example, FIG. 10 shows the case where the part of the cap to be blocked (typically, the primary part 11) is constantly blocked, and code reading, lid piercing and opening/closing of the channel is done simultaneously, all these functions being achieved with the cap rotating only in one direction.

The design presented is a preferred and possible one, but different other possibilities exist: a different mechanical design can also achieve the same functions, as for example the alternative design represented in FIGS. 11a-e, where:

the upper primary part 11 is rigid and comprises pins 40;

the lower secondary part 12 has a rigid contour 42 and a rigid internal part 43; a flexible part 47 can translate under a force, thanks to flexible arms 41.

When rotating one part relative to the other (upper primary part 11 and lower secondary part 12), the pins 40 of the primary part 11 travel on ramps 46 of the secondary part 12, pressing and inducing a vertical force that moves down the flexible part 47 of the secondary part 12 of the cap. This has two consequences:

the channel 130 is opened (typically, a closure 44 is made open);

cutters 45, present on the side of the flexible part 47 facing the lid 21 on the container, pierce this lid.

The cap assembly can be done in any kind of material, but it is preferably made of polymers such as Polypropylene (PP) or Polyethylene (PE).

The cap assembly of the invention is designed in such a way to avoid that it can be opened when not in the machine: for this reason, the design of the cap is made such that the torque required to open the cap is significantly higher than the torque that can be reasonably given by a consumer during normal manipulation. This avoids accidental openings whenever the container and its cap assembly are not correctly placed in the preparation machine.

This can be achieved through different methods, such as for example:

- by adding one or several bridges of material, linking both parts of the cap assembly, that have to be broken during the opening, as it is done for several existing beverage caps;
- by adding on one part of the cap a flexible element that will have to overcome a mechanical obstacle placed on the other part of the cap; overcoming this obstacle will only be possible under a certain force or torque.

Figure 12:
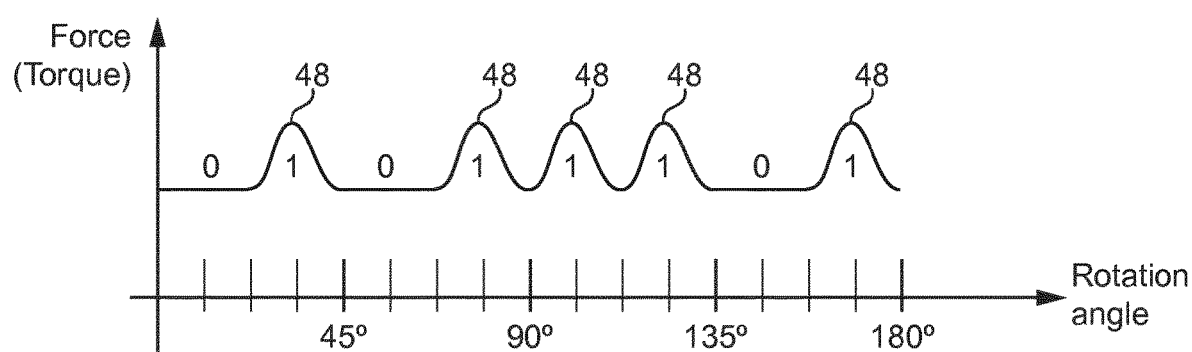
FIG. 12 shows a graph representing the angle of rotation of the two parts of a cap assembly according to the embodiment shown in FIGS. 11a-e in a container according to the invention.
Figure 13:
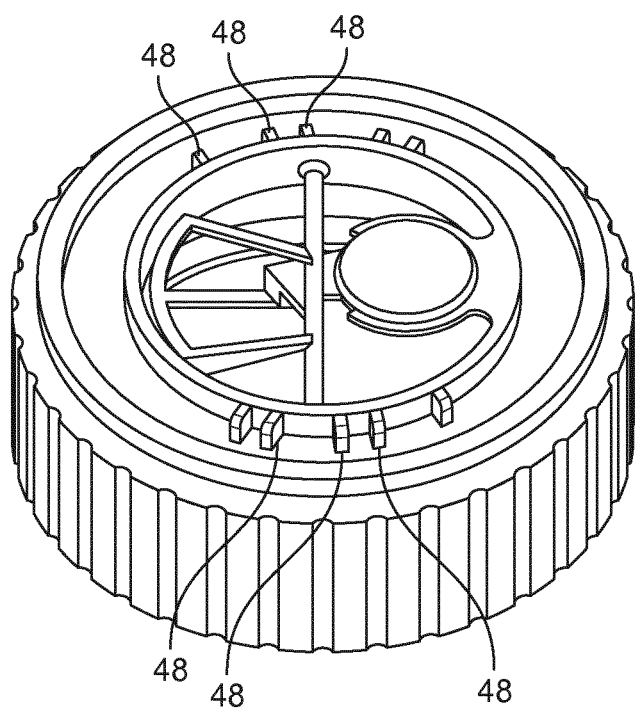
FIG. 13 shows the configuration of the secondary part of a cap assembly according to the embodiment shown in FIGS. 11a-e, comprising further elements to configure a digital code in a container according to the invention.
Figure 14A:
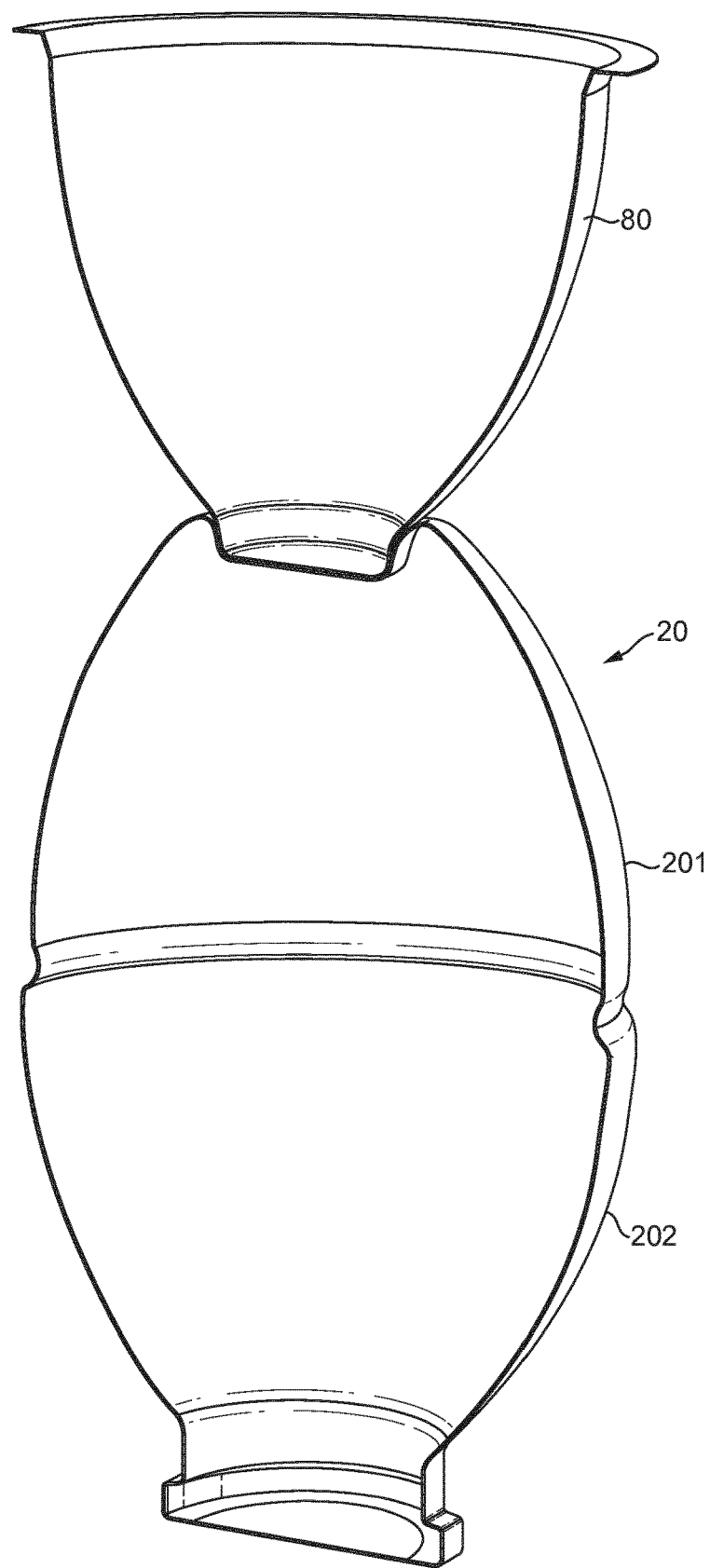
FIGS. 14a-d show actuation means pressing a container in a system according to the present invention in order to expel and deliver the content of it.
Figure 14B:
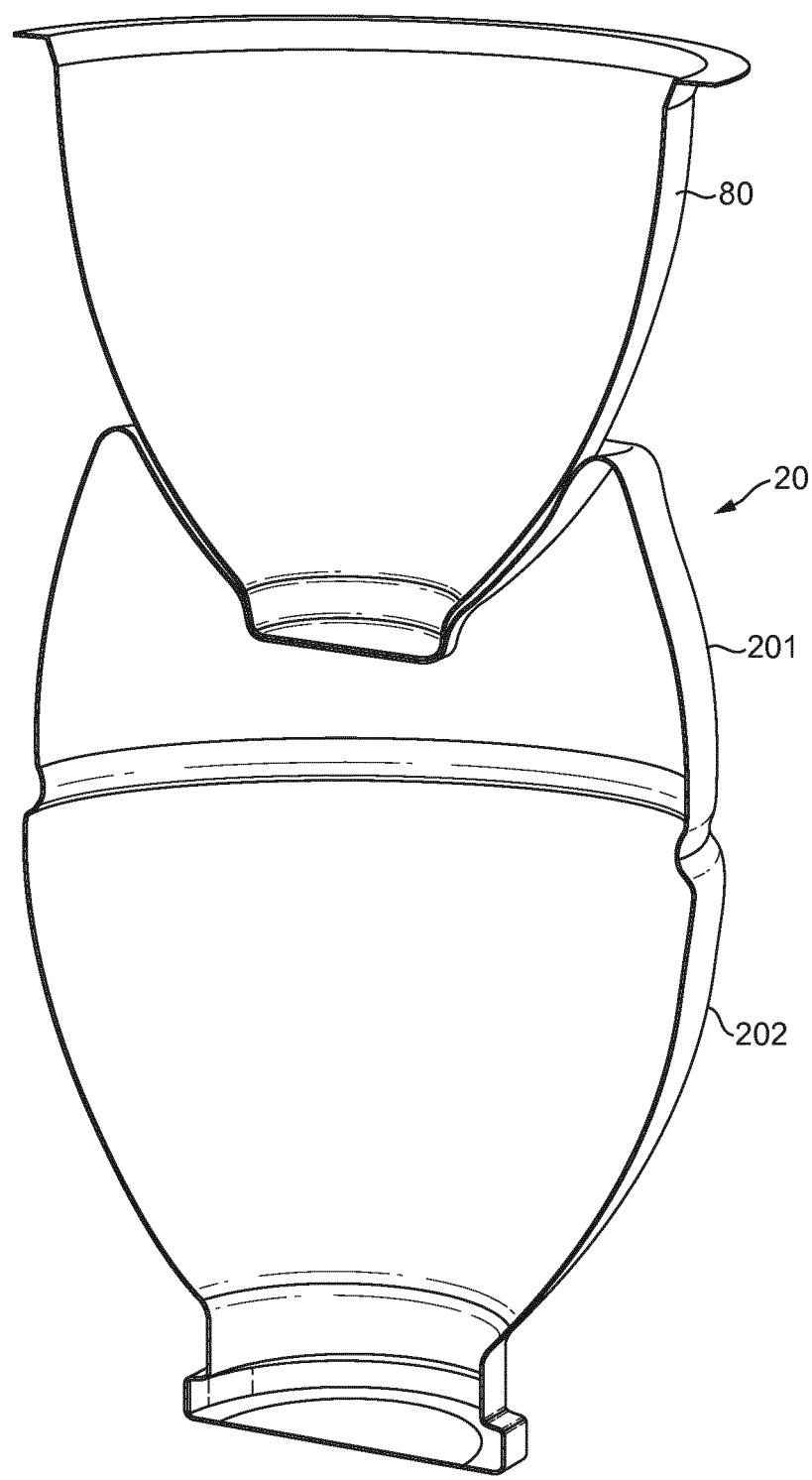
Figure 14C:
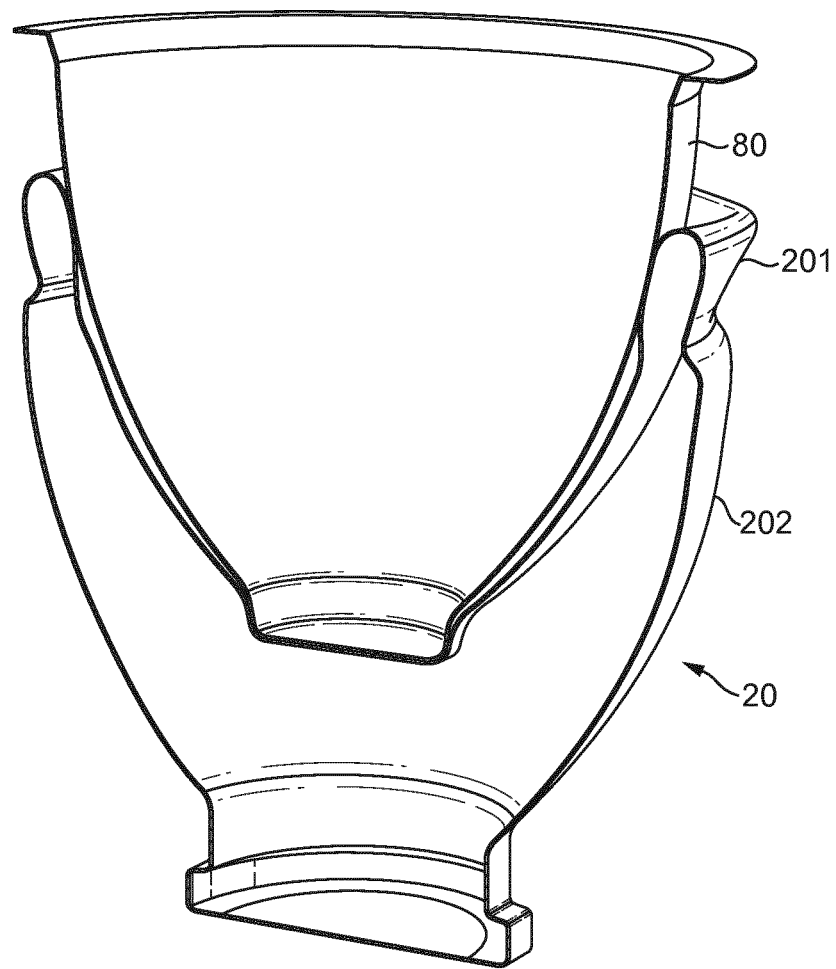
Figure 14D:
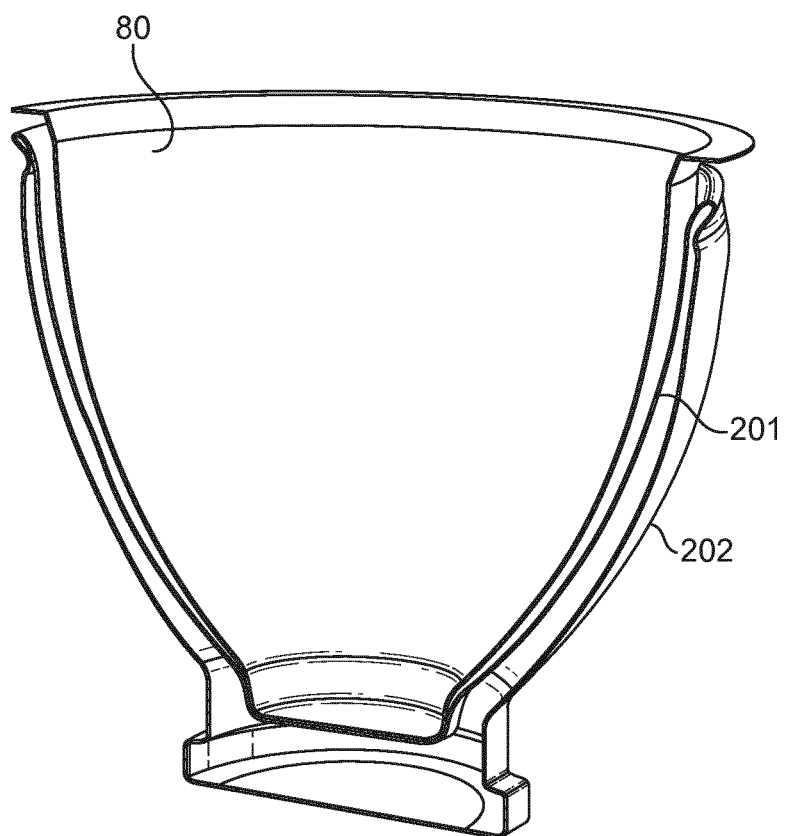

As already explained, elements such as a bridge of material, or a flexible element overcoming the obstacle, will require a certain torque to rotate relative to each other: this torque is almost linear to the current required by the motor, and this current is a physical value that is easy to measure; hence, this principle can be used to constitute a digital code (additional to the identification means or printed code 22 discussed before) that would be composed of 0 and 1, corresponding to the absence or the presence of an obstacle to overcome, at defined locations, as represented by references 48 in FIG. 13. The force (torque values, 0 and 1) in half a rotation of 180° of the two parts of the cap relative to each other, is represented on FIG. 12.

The cap assembly and the full container system in the present invention allow the dispensing of a product contained in a fully sterile container sealed by a lid, to allow the further preparation of fresh single portioned desserts, in a reduced time (typically below 5 minutes) and without requiring any cleaning operation.

The most important feature of the cap assembly of the present invention is that three functions (opening/closing a channel, piercing a lid and reading a code) can be achieved by a single rotation provided of one part of the cap with respect to the other. The design can also be made in such a way that only one or a plurality of functions can be achieved. Moreover, a further code can be provided with further information or parametrization of the process or the container ingredients.

In the present application, the container comprises a fluid that is going to be processed in order to provide a cold or frozen dessert product. The term "fluid" refers to a flowable substance, essentially to liquid or viscous paste or gel, or a mixture of any one of liquid, viscous, paste, gel, with gas inclusion and/or discrete solid pieces, particles, granules, beads, chips and the like. The fluid can be foodstuff such as a dairy or beverage liquid composition or ice cream mix.

The invention further relates to a system for preparing cold or frozen dessert products from a fluid comprised in a container 20. The system comprises a preparation machine or device and a container system 40, the container system comprising a container 20 and a cap assembly 10.

The preparation machine or device is provided with a driving element 31, typically gears, able to engage the cap assembly 10 and rotate the two parts relative to each other, to provide the functions of opening/closing of the outlet, piercing of the lid and code reading. Besides, the machine will be provided with a retention element 32 that will engage a corresponding element on the cap, typically on the secondary part 12, allowing the relative rotation of the two parts of the cap assembly.

The machine further comprises a sensor 33 to read the identification means 22 typically arranged on the container 20.

The machine will further comprise an actuation device that will compress the container in order to deliver the fluid in it for its further preparation. Typically, the container 20 will be shaped as a bottle, having a collapsible part that will compress so as to effect this delivery. Thus, the system will be provided with a mechanical actuation device 80, preferably a piston, configured to apply a pressure on the collapsible part 202 of the container 100 substantially parallel to the container longitudinal axis in order to allow dispensing of the fluid inside. Typically, the mechanical actuation device 80 is dimensioned and shaped as the inner shape of the retaining part 201 of the container and complementarily to the collapsible part 202 so as to engage it and invert it into the inner shape of the retaining part 201. Preferably, the mechanical actuation device 80 is configured to be able to dispense the content of containers having different sizes, collapsing the collapsible part 202 over the retaining part 201. FIGS. 14a-d show this actuation device 80 and the way it works compressing a container 20 configured partially collapsible, as described: the Figures show different steps of such compression.

Preferably, the container 20 has a volume of between 5 ml to 250 ml. The container can have a volume of 10 ml, 25 ml, 50 ml, 75 ml, 100 ml, 125 ml, 150 ml, 175 ml, 200 ml, 225 ml. The dimensions such as radius and height of the body determine the volume of the container, these two parameters being modified depending on the intended shape and use of the container.

Although the present invention has been described with reference to preferred embodiments thereof, many modifications and alternations may be made by a person having ordinary skill in the art without departing from the scope of this invention which is defined by the appended claims.

The invention claimed is:

1. A container comprising:
   an inner volume;
   a food product to be dispensed and positioned in the inner volume, the inner volume being closed by a closure;
   an identification member;
   an engagement member configured to engage with a corresponding driver to displace the identification member according to a pre-defined path in order to allow reading of the identification member;
   an area of revolution, the container is configured to move in rotation allowing rotational displacement of the identification member; and
   a cap assembly comprising the engagement member, wherein the engagement member is configured as gears, and the gears are configured to engage with corresponding driving gears to rotate the container.

2. The container according to claim 1 wherein the cap assembly comprises two parts relatively moveable with respect to each other, one of the parts comprising the gears configured to allow at least partial rotation of the container.

3. The container according to claim 1 wherein the identification member is an optical identification member.

4. The container according to claim 1 wherein the identification member comprises data of the food product and/or processing parameters to prepare said food product.

5. The container according to claim 1 wherein the food product is a fluid from which a chilled or frozen product is prepared.

6. The container according to claim 1, wherein the container is compressible and has a shape selected from the group consisting of a bottle, a pouch, a capsule, a pod and a thermoformed container.

7. A container comprising:
   an inner volume;

a food product to be dispensed and positioned in the inner volume, the inner volume is closed by a closure;

an identification member; and an engagement member configured to engage with a corresponding driver to displace the identification member according to a pre-defined path to allow reading of the identification member;

wherein the container is shaped as a partially collapsible bottle, the container comprising a collapsible part and a retaining part, the collapsible part is configured to collapse at least partially inside the retaining part by application of pressure in a direction of a longitudinal axis of the container.

8. The container according to claim 7 configured to collapse by inverting the shape of the container and conforming to an inner shape of the retaining part in order to allow dispensing of the food product inside the container.

9. A device operable with a container, the device comprising:

a driving element and a reader;

the container comprising an inner volume, the container further comprising a food product to be dispensed and positioned in the inner volume, the inner volume is closed by a closure, the container comprising an identification member;

the driving element configured to engage with an engagement member in the container to displace the identification member according to a pre-defined path with respect to the reader, the device further comprising an actuation device configured to apply a pressure parallel to a longitudinal axis of the container to allow dispensing of the food product inside.

10. The device according to claim 9 wherein the reader is stationary and is able to read information on the identification member travelling in front of the reader.

11. The device according to claim 9 wherein the actuation device comprises a piston having a shape the same as the inner shape of at least part of the container, once the container has been deformed to dispense the fluid inside.

12. A system for preparing cold or frozen dessert products from a fluid in a container, the system comprising a device operable with the container, the container comprising an inner volume, the container further comprising the fluid positioned in the inner volume, the inner volume is closed by a closure, the container comprising an identification member, the container comprising an engagement member configured to engage with a corresponding driver to displace the identification member according to a pre-defined path in order to allow reading of the identification member, the device comprising a driving element and a reader, the container comprises an area of revolution, the container is configured to move in rotation allowing rotational displacement of the identification member, and the container comprises a cap assembly comprising the engagement member, wherein the engagement member is configured as first gears, and the first gears are configured to engage with the driving element of the device to rotate the container, wherein the driving element is configured as second gears.

* * * * *